United States Patent
Clancy et al.

(10) Patent No.: US 7,631,328 B2
(45) Date of Patent: Dec. 8, 2009

(54) DYNAMIC ELECTRONIC PROGRAM GUIDE

(75) Inventors: David Clancy, Berkeley, CA (US); Steven Falkenburg, Los Altos, CA (US); Tantek Celik, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1641 days.

(21) Appl. No.: 10/185,792

(22) Filed: Jun. 27, 2002

(65) Prior Publication Data

US 2004/0002987 A1 Jan. 1, 2004

(51) Int. Cl.
G06F 3/00 (2006.01)
G06F 13/00 (2006.01)
H04N 5/445 (2006.01)
H04N 7/18 (2006.01)

(52) U.S. Cl. .............................. 725/39; 725/49; 725/78; 725/82

(58) Field of Classification Search .................. 715/221, 715/230

See application file for complete search history.

(56) References Cited

U.S. PATENT DOCUMENTS

| | | | |
|---|---|---|---|
| 5,860,073 A | 1/1999 | Ferrel et al. | |
| 5,878,223 A | 3/1999 | Becker et al. | |
| 5,990,883 A | 11/1999 | Byrne et al. | |
| 6,330,566 B1 | 12/2001 | Durham | |
| 6,356,924 B2 | 3/2002 | Mullen-Schultz | |
| 6,862,741 B1 * | 3/2005 | Grooters | 725/39 |
| 2003/0074672 A1 * | 4/2003 | Daniels | 725/110 |
| 2004/0031058 A1 * | 2/2004 | Reisman | 725/112 |
| 2005/0028208 A1 * | 2/2005 | Ellis et al. | 725/58 |
| 2008/0082927 A1 * | 4/2008 | Kelts | 715/762 |

OTHER PUBLICATIONS

U.S. Appl. No. 10/029,310, filed Dec. 20, 2001, Celik et al.

* cited by examiner

Primary Examiner—John W Miller
Assistant Examiner—Omar Parra
(74) Attorney, Agent, or Firm—Lee & Hayes, PLLC

(57) ABSTRACT

Methods, apparatuses, systems, and arrangements enable the dynamic manipulation and utilization of electronic program guide (EPG) data. The EPG data can be dynamically manipulated and utilized while in a displayable format. In an exemplary implementation, EPG data is received from an external source, the received EPG data being in a displayable format. The received EPG data is added to previous EPG data to form current EPG data, the previous EPG data and the current EPG data being in the displayable format while the received EPG data and the previous EPG data are added together. At least a portion of the current EPG data is then displayed. In described implementation(s), the receiving, adding, and displaying are effectuated by a node that is coupled to a gateway in a local network system. The gateway may store and provide EPG data, and the local network may be operable in a television-based entertainment environment.

41 Claims, 13 Drawing Sheets

DYNAMIC ELECTRONIC PROGRAM GUIDE

TECHNICAL FIELD

This disclosure relates in general to dynamically altering an electronic program guide (EPG) presentation and in particular, by way of example but not limitation, to dynamically manipulating and/or displaying an EPG from EPG data that is in a displayable format.

BACKGROUND

Television-based entertainment systems are expanding the programming and services that they offer. In addition to television programs such as those found on broadcast and traditional cable networks, television service providers are adding interactive services and features. These television service providers, such as cable and satellite television providers, are utilizing the increased functionality that is enabled as digital components are added to devices operating in such television-based entertainment systems. These digital components, while not necessarily required, facilitate the implementation of interactive services and features such as electronic program guides (EPGs), digital program recording using an EPG, e-mail capability, information that overlays regular programming, web-surfing, real-time chats, image displaying, game playing, and so forth.

The software and other data information that powers the above enumerated and other services and features are typically referred to collectively as applications in television-based entertainment systems. Television content and applications are downloaded over a television-based entertainment network for display, use, and/or storage on viewer-side set-top boxes or similar digital devices. For example, one or more applications may be employed on a set-top box to provide an EPG to a user.

A complete EPG typically has horizontal and vertical lines, with different horizontal lines of information corresponding to different channels and different vertical "lines" of information corresponding to different time slots or segments at which television programming is scheduled to be broadcast. With the expansion of the number of channels that are available, as well as the great number of hours over a day, a week, or longer, usually only a fraction of the total EPG is displayable at any given time. Consequently, a viewer or user is given the ability to scroll through the EPG in the channel domain and in the time domain.

Accordingly, for television-based entertainment systems, there is a need for techniques and schemes to enable users to scroll horizontally, vertically, and around an EPG regardless of the relative simplicity or complexity of the viewer-side television-based device.

SUMMARY

Methods, apparatuses, systems, and arrangements enable the dynamic manipulation and utilization of electronic program guide (EPG) data. The EPG data can be dynamically manipulated and utilized while in a displayable format. In an exemplary implementation, EPG data is received from an external source, the received EPG data being in a displayable format. The received EPG data is added to previous EPG data to form current EPG data, the previous EPG data and the current EPG data being in the displayable format while the received EPG data and the previous EPG data are added together. At least a portion of the current EPG data is then displayed. In described implementation(s), the receiving, adding, and displaying are effectuated by a node that is coupled to a gateway in a local network system. The gateway may store and provide EPG data, and the local network may be operable in a television-based entertainment environment.

BRIEF DESCRIPTION OF THE DRAWINGS

The same numbers are used throughout the drawings to reference like and/or corresponding aspects, features, and components.

DETAILED DESCRIPTION

The following discussion is directed to television-based entertainment systems, such as interactive TV networks, cable networks that utilize electronic program guides, Web-enabled TV networks, and so forth. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described systems and methods can be used in any of these environments and for any types of client devices, they are described in the context of the following exemplary upstream and downstream environments.

Exemplary Upstream System Architecture

Figure 1:
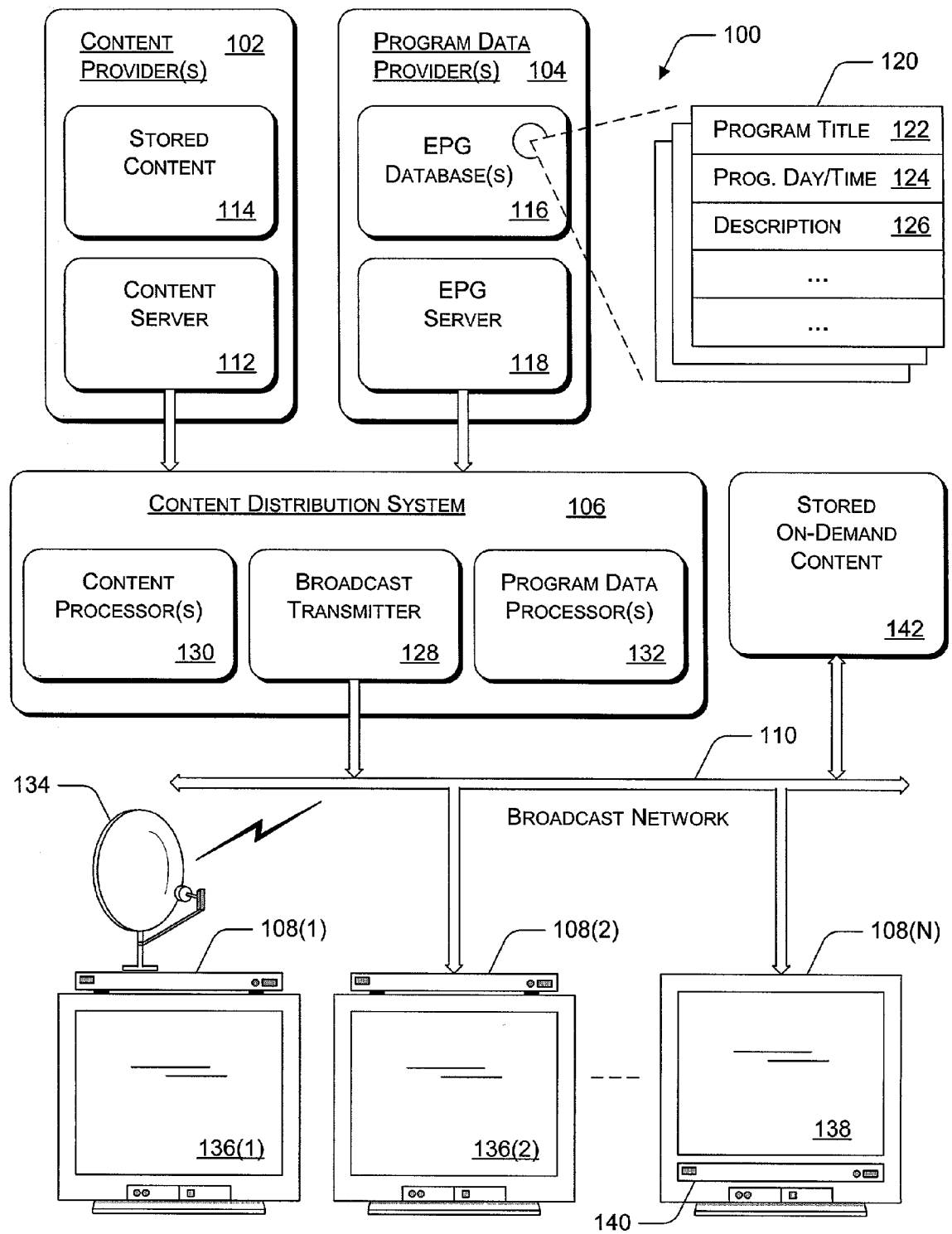
FIG. 1 illustrates an exemplary television system architecture in which the systems and methods for dynamic EPGs can be implemented.

FIG. 1 illustrates an exemplary television entertainment system 100 that is an upstream architecture in which EPGs may be dynamically altered and/or presented. System 100 facilitates distribution of content and program data to multiple viewers. System 100 includes one or more content providers 102, one or more program data providers 104, a content distribution system 106, and multiple client devices 108(1), 108(2), . . . , 108(N) that are coupled to content distribution system 106 via a broadcast network 110.

Content provider 102 includes a content server 112 and stored content 114, such as movies, television programs, commercials, music, and similar audio and/or video content. Content server 112 controls distribution of the content of stored content 114 from content provider 102 to content distribution system 106. Additionally, content server 112 controls distribution of live content (e.g., content that was not previously stored, such as live feeds) and/or content stored at other locations to content distribution system 106.

Program data provider 104 includes one or more electronic program guide (EPG) databases 116 and an EPG server 118. EPG database 116 stores electronic files of program data 120 which is used to generate an electronic program guide (or, "program guide"). Program data 120 includes program titles, ratings, characters, descriptions, actor names, station identifiers, channel identifiers, schedule information, and so on. The terms "program data" and "EPG data" are used interchangeably throughout this discussion. For discussion purposes, an electronic file maintains program data 120 that may include a program title 122, a program day or time 124 to identify the program scheduling occurrence or occurrences, a program description 126 to explain and describe the content of the program or programs, and so forth.

EPG server 118 processes the EPG data prior to distribution to generate a published version of the program data which contains programming information for many or all channels for one or more days. The processing may involve any number of techniques to reduce, modify, or enhance the EPG data. Such processes might include selection of content, content compression, format modification, and the like. EPG server 118 controls distribution of the published version of the program data from program data provider 104 to content distribution system 106 using, for example, a file transfer protocol (FTP) over a TCP/IP network (e.g., Internet, UNIX, etc.) or another technique. Further, the published version of the program data can be transmitted from program data provider 104 via a satellite directly to a client device 108.

Content distribution system 106 includes a broadcast transmitter 128, one or more content processors 130, and one or more program data processors 132. Broadcast transmitter 128 broadcasts signals, such as cable television signals, across broadcast network 110. Broadcast network 110 can include a cable television network; an RF, microwave, satellite, and/or data network, such as the Internet; and may also include wired or wireless media using any broadcast format or broadcast protocol. Additionally, broadcast network 110 can be any type of network, using any type of network topology and any network communication protocol, and can be represented or otherwise implemented as a combination of two or more networks.

Content processor 130 processes the content received from content provider 102 prior to transmitting the content across broadcast network 110. Similarly, program data processor 132 processes the program data received from program data provider 104 prior to transmitting the program data across broadcast network 110. A particular content processor 130 may encode, or otherwise process, the received content into a format that is understood by the multiple client devices 108(1), 108(2), . . . , 108(N) that are coupled to broadcast network 110. Although FIG. 1 shows a single content provider 102, a single program data provider 104, and a single content distribution system 106, exemplary system 100 can include any number of content providers and/or program data providers coupled to any number of content distribution systems.

Content distribution system 106 is representative of a headend service that provides EPG data, as well as content, to multiple subscribers. Each content distribution system 106 may receive a slightly different version of the program data that takes into account different programming preferences and lineups. EPG server 118 creates different versions of EPG data (e.g., different versions of a program guide) that include those channels of relevance to respective headend services, and content distribution system 106 transmits the EPG data to multiple client devices 108(1), 108(2), . . . , 108(N). In one implementation, for example, content distribution system 106 utilizes a carousel file system to repeatedly broadcast the EPG data over an out-of-band (OOB) channel to client devices 108. However, other EPG data distribution implementations may alternatively be employed.

Client devices 108 can be implemented in a number of ways to realize a node on the downstream side of a television-based entertainment environment. For example, a client device 108(1) receives broadcast content from a satellite-based transmitter via a satellite dish 134. Client device 108(1) may also be referred to as a set-top box or a satellite receiving device. Client device 108(1) is coupled to a television 136(1) for presenting the content received by the client device (e.g., audio data and video data), as well as a graphical user interface and/or other application outputs such as an EPG. A particular client device 108 can be coupled to any number of televisions 136 and/or similar devices that can be implemented to display or otherwise render content. Similarly, any number of client devices 108 can be coupled to a single television 136.

Client device 108(2) is also coupled to receive broadcast content from broadcast network 110 and to provide the received content to associated television 136(2). Client device 108(N) is an example of a combination television 138 and integrated set-top box 140. In this example, the various components and functionality of the set-top box are incorporated into the television, rather than using two separate devices. The set-top box that is integrated into the television can receive broadcast signals via a satellite dish (similar to satellite dish 134) and/or via broadcast network 110. In alternate implementations, client devices 108 may receive broadcast signals via the Internet or any other broadcast medium.

Each client device 108 is capable of running an EPG/feature application that utilizes the program data. An EPG application enables a television viewer to navigate through an onscreen program guide and locate television shows of interest to the viewer. With an EPG application, the television viewer can (i) look at schedules of current and future programming, (ii) scroll through channels one at a time or by page either upwards or downwards at a given range of programming times, (iii) scroll through time by one hour (or other unit) of time or by page either backwards or forwards for a given set of channels, (iv) set reminders for upcoming programs, (v) and/or enter instructions to record one or more television shows, and so forth.

Exemplary system 100 also includes stored on-demand content 142, such as Video On-Demand (VOD) movie content, Moving Pictures Expert Group (MPEG)-based files from, e.g., the Internet, and so forth. The stored on-demand content can be viewed with a television 136/138 via a client device 108 responsive to input garnered through an onscreen movie guide, for example, in which a viewer can enter instructions to stream a particular movie, or other stored content, down to a corresponding client device 108 over broadcast network 110. In situations such as these in which two-way communication(s) may be utilized, broadcast network 110 may be capable of bi-directional communication.

Figure 2:
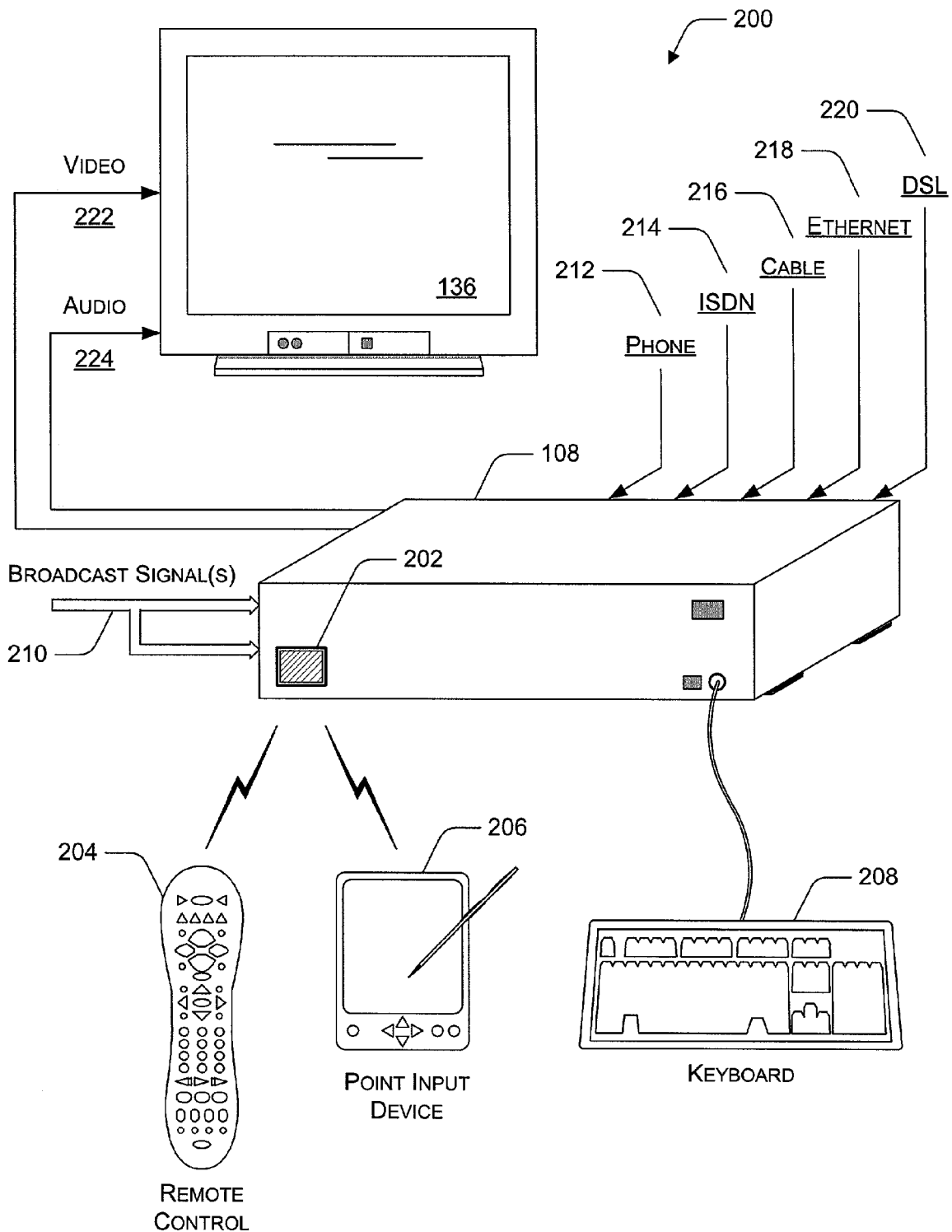
FIG. 2 illustrates an example of a client device, a television, and various input devices that interact with the client device.

FIG. 2 illustrates an exemplary implementation 200 of a client device 108 shown as a standalone unit that connects to a television 136. Client device 108 can be implemented in a number of ways to realize a node on the downstream side of a television-based entertainment environment. For example, client device 108 can be implemented as a set-top box, a satellite receiver, a TV recorder with a hard disk, a digital video record (DVR) and playback system, a computer with television capabilities, a game console, an information appliance, and so forth. The following description of client device 108 references components, features, etc. that certain client devices 108 may have, but other implementations of a client device 108 may have fewer than all or none of these particular components, features, and so forth.

Client device 108 can include a wireless port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), a handheld computer, a wireless phone, or the like. Additionally, a wired keyboard 208 can be coupled to communicate with client device 108. In alternate embodiments, remote control device 204, handheld device 206, and/or keyboard 208 may use an RF communication link or other mode of transmission to communicate with client device 108.

Client device 108 receives one or more broadcast signals 210 from one or more broadcast sources, such as from a satellite or from a broadcast network, e.g. via broadcast network 110 (of FIG. 1). Client device 108 includes hardware and/or software for receiving and decoding a broadcast signal 210, such as an NTSC, PAL, SECAM or other TV system video signal. Client device 108 also includes hardware and/or software for providing the user with a graphical user interface by which the user can, for example, access various network services, execute and interact with different applications, configure client device 108, utilized an EPG, and perform other functions.

Client device 108 can communicate with other devices via one or more connections including a conventional telephone line or link 212, an ISDN link 214, a cable link 216, an Ethernet link 218, a DSL link 220, and the like. Client device 108 may use any one or more of the various communication links 212-220 at a particular instant to communicate with any number of other devices.

Client device 108 generates video signal(s) 222 and audio signal(s) 224, both of which are communicated to television 136. The video signals and audio signals can be communicated from client device 108 to television 136 via an RF (radio frequency) link, S-video link, composite video link, component video link, or other communication link. Although not shown in FIG. 2, client device 108 may include one or more lights or other indicators identifying the current status of the device. Additionally, client device 108 may include one or more control buttons, switches, or other selectable controls for controlling operation of the device.

Exemplary Downstream System Architecture

Figure 3:
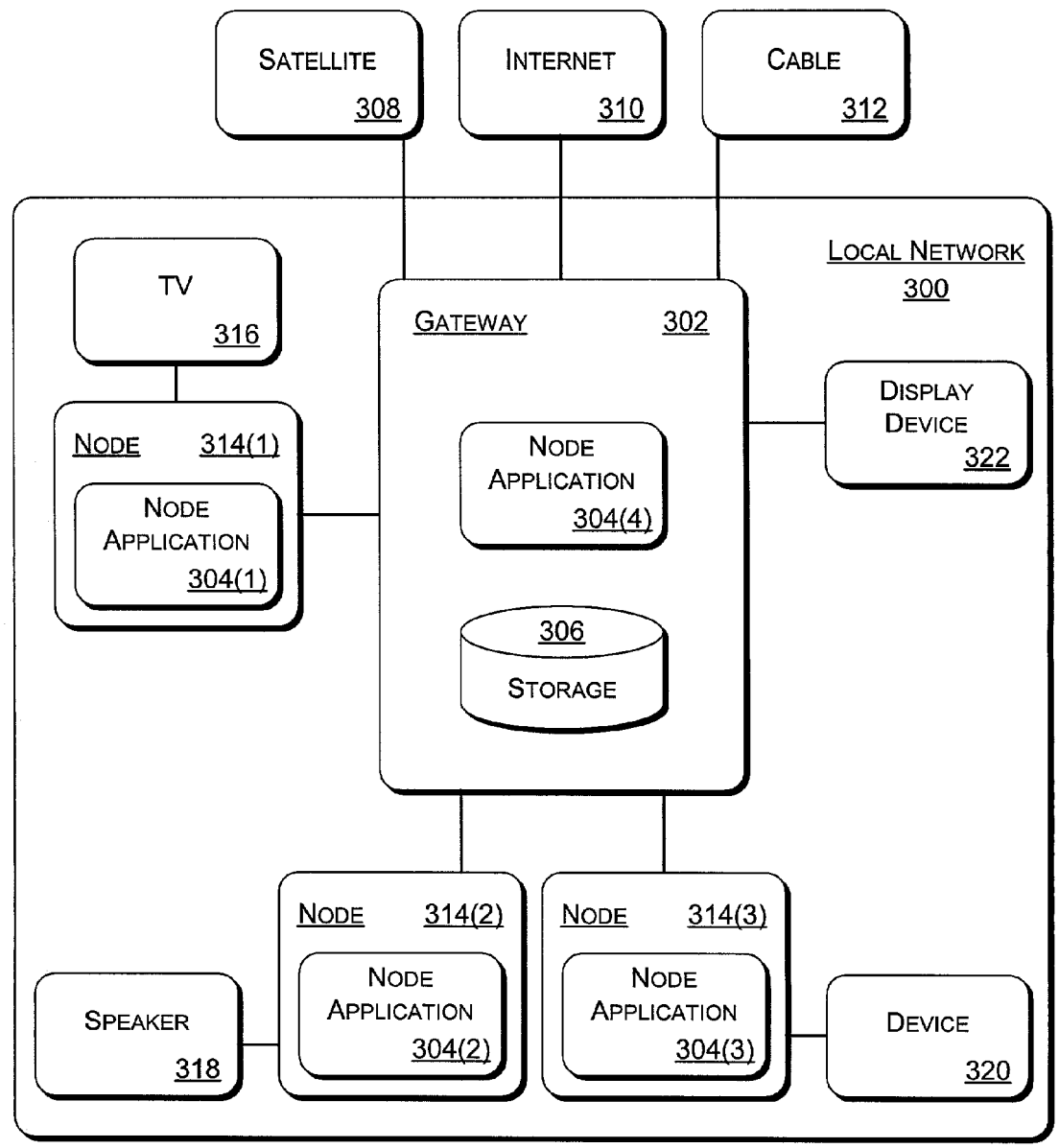
FIG. 3 illustrates an exemplary local network that includes a gateway to distribute content received from multiple content sources to multiple nodes in the local network.

The exemplary television entertainment system 100 (of FIG. 1) focuses, although not exclusively, on an upstream architecture in which EPGs may be dynamically altered and/or presented. Hence, the description of system 100 focuses on delivering content, EPG data, etc. to a destination of a television-based entertainment environment. However, a destination need not necessarily be composed of a single client device 108. For example, a destination for system 100 may comprise a local network that covers, for example, a home, a business, an apartment or condo building, and so forth. Disclosure of systems and methods that may be employed as such, and in such, an exemplary local network may be found in United States Nonprovisional Patent Application entitled "Scaling and Delivering Distributed Applications" and assigned U.S. Nonprovisional patent application Ser. No. 10/029,310. U.S. Nonprovisional patent application Ser. No. 10/029,310, having a filing date of Dec. 20, 2001, is hereby incorporated by reference in its entirety herein. FIG. 3 et seq. focus, although not exclusively, on a downstream architecture in which EPGs may be dynamically altered and/or presented.

FIG. 3 illustrates an exemplary local network 300 that includes a gateway 302 to distribute content received from multiple content sources to multiple nodes 314 in local network 300. Local network 300 may comprise a network covering, for example, a home, a business, an apartment or condo building, and so forth. Local network 300 has access to content through various systems and networks which may include, but are not limited to, a satellite system/network 308, the Internet 310, a cable system/network 312, and so forth, or any combination thereof. The content received or transmitted over satellite system/network 308, Internet 310, cable system/network 312, and so forth includes, but is not limited to, email, instant messages, audio, video, programming guide data, television broadcast data, streaming video/audio data, satellite or cable television content, image data, text, and so forth, or any combination thereof. Transmission medium or media for these content sources 308, 310, and 312 may correspond to broadcast network 110 (of FIG. 1).

Gateway 302 functions as a gateway for local network 300. Gateway 302 may comprise, for example, a server, a general-purpose computer, a client device 108 (of FIG. 1), and so forth. Gateway 302 includes components that permit it to interface with and receive information/data from satellite system/network 308, Internet 310, and/or cable system/network 312, and so forth. For example, gateway 302 may include one or more tuners that may be tuned to satellite and cable signals at particular channels. Gateway 302 may also include component(s) for generating a video stream from the tuned channels that can be rendered, for example, on a display device such as a television 136/138 (of FIG. 1), on a computer monitor, and so forth. These types of components for generating a video stream may also or alternatively be included on one or more of nodes 314.

Gateway 302 includes storage 306. Storage 306 is a memory that may be used to store applications, content, and so forth. Storage 306 may be realized from any one or more magnetic, optical, electronic, etc. memories of a volatile or nonvolatile type. Also, such memory may be removable, fixed, and so forth. Storage 306 may be used to record programs that are broadcast over satellite and/or cable systems. Storage 306 may also store programming guide data for the programs that will be broadcast over the satellite and cable systems, as appropriate. Storage 306 may also store content downloaded over the Internet, such as emails, instant messages, and the like. Gateway 302 may also provide other components and functionality including, but not limited to, television event recording, scheduling, and conflict resolution; programming guide data management; satellite data download services; a Network Address Translation (NAT) server; a time server; a Dynamic Host Configuration Protocol (DHCP) server; and so forth. Alternatively, some of this functionality may reside at nodes 314.

Local network 300 also includes one or more nodes 314 that are represented as node 314(1), node 314(2), and node 314(3). Nodes 314 may correspond, for example, to client devices 108 (of FIG. 1) in some implementations. Each node 314 is typically connected with gateway 302 using various connections that are known in the art. These connections include, but are not limited to, a local area network (LAN), an IEEE 802.11b wireless network, a Bluetooth® network, or any other wireless and/or wired network or networks. In the exemplary local network 300 of FIG. 3, each node 314 is also connected to at least one device; however, any particular node 314 is not required to be connected with a separate device. For instance, a node 314 may be a computer that has an integrated computer monitor, may be a client device 108(N) that is a combination television 138 and integrated set-top box 140, and so forth. Alternatively, a particular node 314 may be a set-top box 108(1)/108(2) that is associated with a separate device, such as a separate television 136.

In this example, node 314(1) is connected with a television 316. Thus, gateway 302 is able to distribute video/audio content to node 314(1) which is in turn rendered on television 316. Node 314(2) is connected with a speaker 318, and gateway 302 is able to distribute audio from one of content sources 308/310/312 to node 314(2), which delivers the audio to speaker 318. Other devices may be connected to a particular node 314 in dependence on the type of content to be received via the content sources. Thus, a device 320 represents devices in general, and it may be a television, a computer monitor, a speaker, an interactive frame able to display image content, an Internet appliance, or any other device. The content intended for device 320 is delivered or distributed through node 314(3). Because gateway 302 may be used as if it were a node 314 in some instances, a display device 322 is connected to gateway 302 in local network 300. For example, gateway 302 may include a virtual node 314 that is integral with server-type hardware within a single physical apparatus. Moreover, gateway 302 functions and (virtual) node 314 functions may be performed using the same processor(s) and/or the same memory or memories.

Each node 314 is capable of executing applications, as is described below. Each node 314 has a number of resources that are dynamically allocated to the various applications that are executing on a particular node 314 by a node application 304, as is also described below. Exemplary resources of each node 314 may include, but are not limited to, processing, a network interface, input, server resources, memory, screen output/space, sound output, events, and so forth. Exemplary applications or features of each node 314 may include, but are not limited to, an overall user interface/feature navigation/preferences application, a programming guide data application, an audio/video player application, a video recording application, a media jukebox application, a web browsing application, an e-mail application, an instant messaging application, and so forth.

Generally, individual applications (not explicitly shown in FIG. 3) may be distributed across a given node 314 and gateway 302. For example, each application that is distributed across a node 314 and a gateway 302 may have a user interface portion and a process portion. The user interface portion is loaded on the node 314 by the corresponding node application 304 to present content to a user that is specific to that distributed application. The process portion of the distributed application typically executes on gateway 302 and is able to take advantage of the gateway's resources to perform tasks that are computationally more expensive. Alternatively, the distributed application creates one or more service portions that can execute on either gateway 302 or node 314 to perform operations for the user interface portion. User interface, process, and service portions are described further below with reference to FIGS. 5A and 5B.

Node applications 304 support the user interface portion of the distributed applications. Node applications 304 provide implementation(s) of multiple standards including, but not limited to, HTML, XML, XHTML, CSS, PNG, MNG, JPEG, MPEG, DOM, ECMAScript, SOAP, HTTP, TCP/IP, DCOM, and so forth. Node applications 304 also provide compatibility between the distributed applications and a node 314 thereof, enable applications to gauge and distribute across gateway 302 and the node dynamically, and enable applications to be run locally on both the node and the gateway. Node applications 304 thus support the loading and running of applications on nodes 314 and gateway 302. Furthermore, the allocation of resources to applications, including distributed applications, which are currently running on a node 314(X) is effectuated by a respective node application 304(X).

Figure 4A:
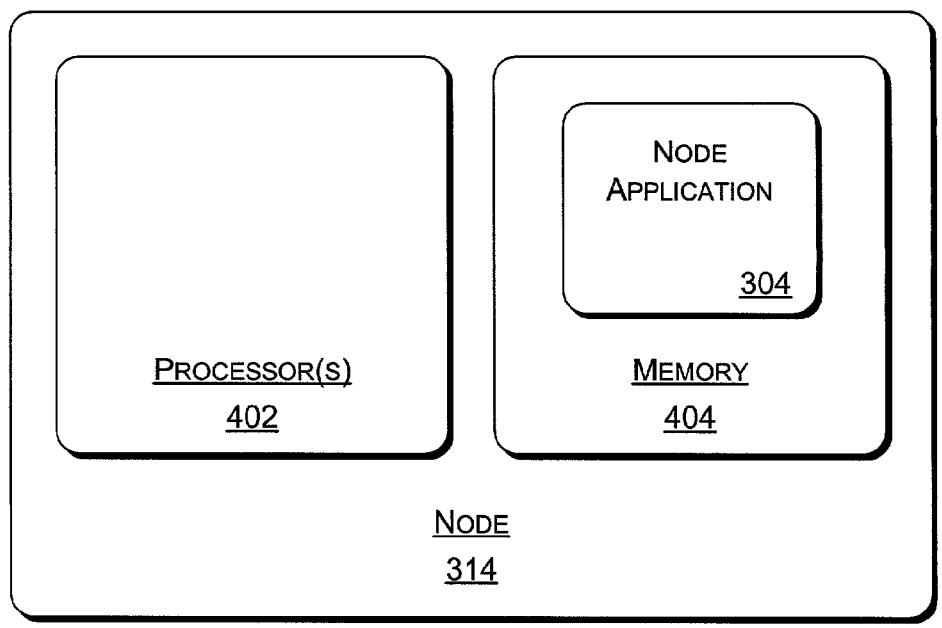
FIG. 4A is a block diagram of an exemplary node that includes a node application.

FIG. 4A is a block diagram of an exemplary node 314 that includes a node application 304. Node 314 includes one or more processors 402 and one or more memories 404. Processor 402 is capable of processing various instructions to control the operation of node 314 and to communicate with other components and/or other electronic/computing devices. Memory 404 can be implemented with one or more memory components, examples of which include a random access memory (RAM), a disk drive or other mass storage component, a non-volatile memory (e.g., ROM, Flash, EPROM, EEPROM, etc.), and so forth. While any single type of memory or combination of memory types is possible, memory 404 most likely includes at least (i) a RAM for processing and (ii) some non-volatile memory for longer-term storage. Memory 404 is adapted to store various instructions, data, and/or information such as operating system and/or configuration information, received content, EPG data, graphical user interface (GUI) information, applications, and so forth Specifically, memory 404 stores computer-executable instructions, relevant data structures, and/or any other information for implementing functions of a node 314 of local network 300 (of FIG. 3), including one or more of the functions of a client device 108 (of FIG. 1). For example, memory 404 stores a node application 304 and one or more other applications, including distributed applications (not explicitly shown in FIG. 4A). Processor 402 and memory 404 may be integrated together on one or more dedicated chips (e.g., one or more ASICs) or may be general-purpose processor and memory components. Also, for nodes that are part of a gateway 302 (e.g., virtual nodes), processor 402 and memory 404 may be shared across one or more other tasks, including server-related tasks, being performed by such a gateway 302.

It should be noted that nodes 314 can include a range of processing and memory capabilities, and may include more or fewer types of memory components than those enumerated above. For example, full-resource nodes 314 can be implemented with substantial memory and processing resources, including a disk drive or similar mass storage medium. Low-resource nodes 314, on the other hand, may have limited processing and memory capabilities, such as a limited amount of RAM, no disk drive, limited processing capabilities, and so forth. Usually, however, nodes 314 of a local network 300 will gravitate towards lower-resource nodes that rely partly, if not substantially, on the processing and/or storage capabilities of an associated gateway 302. Although not explicitly shown, nodes 314 may include a decoder to decode a broadcast video signal, such as an NTSC, PAL, SECAM, or other TV system video signal.

Figure 4B:
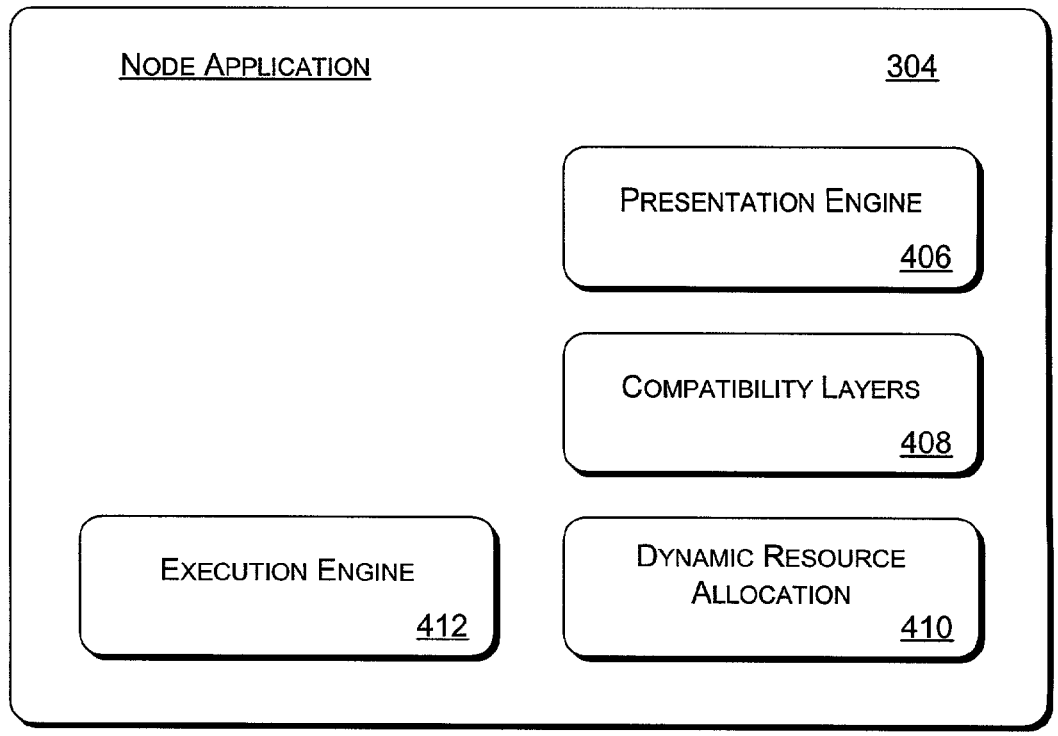
FIG. 4B is a block diagram of an exemplary node application that illustrates a tiered structure thereof.

FIG. 4B is a block diagram of an exemplary node application 304 that illustrates a tiered structure thereof. A node application 304, when loaded on a particular node 314, enables other applications to be loaded and executed on that particular node 314. Node application 304 generates an overall user interface at node 314, provides the user with the ability to navigate to various applications, loads and unloads applications on the node, and manages and allocates the node resources for the various applications that are running or will run on the node. Node application 304 may provide support for some applications on node 314 while other applications are dynamically loaded/unloaded from a gateway 302.

Node application 304 includes a presentation engine 406, an execution engine 412, compatibility layers 408, and dynamic resource allocation module 410. Presentation engine 406 provides at least partial, if not complete, implementation of various standards including, but not limited to, HTML4, CSS1, PNG 1, other W3C standards, and so forth. Presentation engine 406 is used by an application to draw or generate a user interface. Execution engine 412 provides implementations of other standards, including but not limited to DCOM, COM, and ECMAScript, that permit the application(s) that are loaded by node application 304 to execute code. Compatibility layers 408 allow node application 304 to execute on different operating systems and processor architectures. Dynamic resource allocation (module) 410 enables specific applications to dynamically gauge and distribute processor load at runtime across node 314 and gateway 302. Node application 304 also includes other modules, such as a loading module that is used (i) to load and unload the user interface portion(s) of the, e.g., feature applications and (ii) to make requests to the process portion(s) of the feature applications or to service portion(s) of the feature applications.

As alluded to above, nodes 314 are frequently not required to have the same resources as a gateway 302. In fact, the hardware requirements of each node 314 can be significantly reduced if so desired. For example, individual nodes 314 are not required to have a hard drive or other mass storage device. Each node 314 may have a relatively small amount of software, and each node 314 may rely on an associated gateway 302 to provide the processing required by each application. Typically, each node 314 has at least the following functionality that is usually stored in read only memory (ROM): a boot client; a network stack; an HTTP or TFTP client, and a simple user interface screen.

When a node 314 is turned on or initialized, the boot client displays a simple user interface to the user and obtains an address from an associated gateway 302. If a node application 304 is not already stored on node 314, a node application 304 is retrieved from gateway 302. When gateway 302 receives the request for a node application 304, gateway 302 provides node application 304 to node 314, if a node application 304 is available for that specific node type. Alternatively, gateway 302 can request the appropriate node application from another site over a network such as the Internet, by using a dial up connection, and so forth. The request can be made, for example, over a network 110 (of FIG. 1).

Once node application 304 is provided to node 314, node application 304 begins to execute on node 314 and displays a preliminary user interface. In one example, node application 304 requests a current date and time from gateway 302. Node application 304 may also retrieve node preferences from gateway 302. If node 314 is a new node 314, a preference profile is created for new node 314. The node preference or preference profile includes, for example, the location of the node, the type of node, node serial number, node capabilities, and so forth. Next, node application 304 requests an initial user interface from gateway 302, and the initial user interface is displayed. From the initial user interface, the user can select applications that will be loaded and executed through node application 304. Any of the above requesting steps may be omitted if the information that is otherwise requested from gateway 302 is instead already stored at node 314.

Figure 5A:
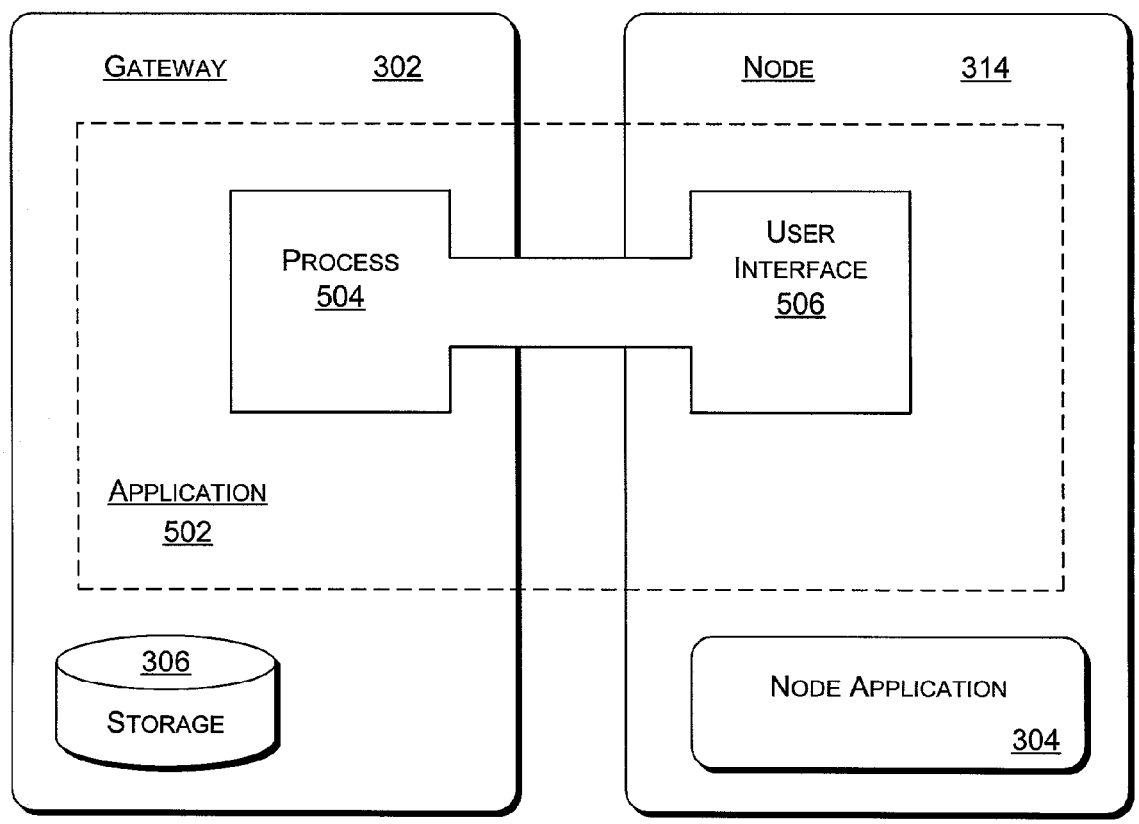
FIG. 5A is a block diagram of a gateway and a node that illustrate an exemplary distributed application.
Figure 5B:
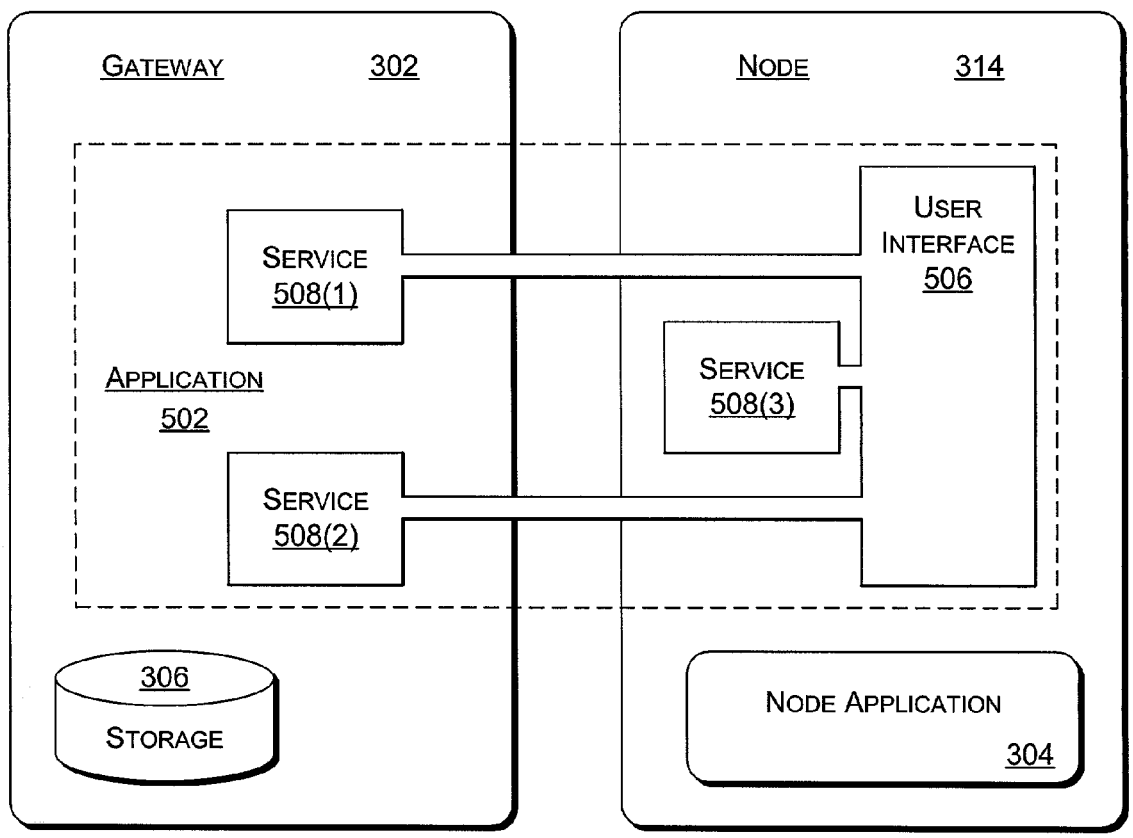
FIG. 5B is a block diagram of the gateway and the node that illustrate another exemplary distributed application.

FIGS. 5A and 5B are block diagrams of a gateway 302 and a node 314 that illustrate exemplary distributed applications 502. Generally, the block diagrams illustrate how an application 502 can be distributed between a node 314 and a gateway 302. Specifically, FIG. 5A illustrates an example in which distributed application 502 has a user interface portion 506 executing on node 314 and a process portion 504 executing on gateway 302. FIG. 5B illustrates an example in which distributed application 502 has a user interface portion 506 executing on node 314 and one or more service portions 508 that are executing on either gateway 302 or node 314.

The block diagram of FIG. 5A illustrates both application development and application distribution in a local network 300 (of FIG. 3). Gateway 302 is in communication with node 314 via local network 300. In this example, distributed application 502 is dynamically distributed between node 314 and gateway 302. Distributed application 502 includes process portion 504 on gateway 302 and user interface portion 506 on node 314. Node application 304 is responsible for loading/ unloading distributed application 502 and for allocating resources of node 314 to user interface portion 506 of distributed application 502. Distributed application 502 may operate within node application 304. Although FIG. 5A illustrates a single distributed application 502, node application 304 is able to support multiple applications, non-distributed as well as distributed, and is able to allocate the resources of node 314 between such applications.

Node application 304 is capable of providing support to user interface portion 506 of distributed application 502 by providing implementation(s) of various standards as previously described. Node application 304 thus provides support for data driven applications such as, but not limited to, HTML, XML, XHTML, CSS, PNG, MNG, JPEG; MPEG, combinations thereof, and so forth. Node application 304 also provides support for processing aspects of user interface portion 506, including but not limited to, DOM, ECMAScript, combinations thereof, and so forth. Using node application 304, user interface portion 506 is able to build a user interface for distributed application 502. User interface portion 506 may use node application 304 to perform presentation-related functions as well as processing-related functions.

Node application 304 also supports remote procedure calls (RPC). For example, node application 304 may use Distributed Component Object Model (DCOM) and/or Simple Object Access Protocol (SOAP) to permit user interface portion 506 to make function or procedure calls to process portion 504 of distributed application 502. Node application 304 also provides for custom loaded code such as behaviors for script or code encapsulation.

The block diagram of FIG. 5B is similar to that of FIG. 5A except that process portion 504 has been replaced by service portions 508(1), 508(2), and 508(3). In this example, user interface portion 506 is able to make procedure calls and function calls using appropriate protocols. However, the procedure and function calls are made to service portions 508(1), 508(2), and/or 508(3). In this example, service portion 508(3) resides and executes on node 314 while service portions 508(1) and 508(2) reside and execute on gateway 302. In one example, service portions 508 are objects that are capable of, for example, performing tasks or procedures on data. In another example, service portions 508 are DCOM objects and user interface portion 506 is able to issue calls to service portions 508 because node application 304 supports DCOM. Service portions 508 can be created by user interface portion 506 or can already exist as part of gateway 302 or node 314.

The following example is explained primarily in the context of FIG. 5A using a user interface portion 506 and a process portion 504. This example, however, can be adapted for implementation with the service portions 508 of FIG. 5B. One capability of a node 314 is to provide programming content as well as programming guide data to a user. The guide data provides the user with a description of the programming that is currently showing as well as the programming that will be shown in the future. The guide data includes, but is not limited to, starting and ending times, program length, program title, program rating, program description, and so forth. A guide data application, in this example, is responsible for providing or displaying the guide data to the user.

Thus, such an exemplary guide data application has a process portion 504 (or one or more service portions 508) and a user interface portion 506 that are distributed across gateway 302 and node 314. When the user desires to view the guide data, user interface portion 506 of the guide data application (e.g., a distributed application 502) makes a call to process portion 504 of the guide data application. Process portion 504, because it is at gateway 302, processes the request and retrieves the data from a database of guide data (e.g., that is stored at storage 306). Process portion 504 also performs any multiplexing of content, and other processing, as required or desirable. The EPG data that is returned to user interface portion 506 is displayed by user interface portion 506 using the support and standards provided by node application 304.

More particularly from the perspective of node application 304, and to illustrate the distribution of process portion 504 and user interface portion 506 of a guide data application, assume that the user is watching television from within a television application. A guide button is then pressed on a remote control by the user. In response, an event handler in the television application launches the guide data application. User interface portion 506 components of the guide data application may include, but are not limited to, an XHTML representation of the user interface, a placeholder area within the XHTML for advertisements, a placeholder area with the XHTML to hold a guide data grid, a CSS to describe the presentation and layout of the guide data XHTML, a behavior to control the dynamic creation of the guide data with user interaction, and so forth.

Next, the guide data grid is styled by user interface portion 506 of the guide data application using the CSS provided by node application 304 and is rendered for the user. A request is sent to gateway 302 to retrieve ads, and the retrieved ads are rendered within the ad placeholder area. The current time is retrieved internally, and the channel to which node 314 is currently tuning is also retrieved. Then, a query is issued to gateway 302 to retrieve the adjacent channels, and a query is also issued to gateway 302 to retrieve the program names, dates, times, and channel range, which are formatted for display in the guide data grid. These requests for data are processed by process portion 504 of the guide data application. Thus, process portion 504 of the guide data application responds to each query or request and processes and formats the guide data for display in the grid. Next, the formatted guide data is returned to node 314 and is rendered in the grid placeholder area. As the user scrolls through the guide data, additional requests or queries are made to gateway 302 in order to retrieve data for the channels being scrolled to by the user. In this manner, applications 502 and the functionality thereof may be distributed across a gateway 302 and a node 314.

From the perspective of a gateway 302, distributing an application 502 across the gateway and a node 314 begins when the gateway receives a request for a node application 304. If gateway 302 has a node application 304 that is compatible with the requesting node 314, then gateway 302 returns the compatible node application 304, where it is loaded by node 314. Otherwise, gateway 302 can access the Internet (or other upstream network) for a compatible node application 304.

When a feature application 502 (e.g., a non-node application 304) is selected on a node 314, gateway 302 receives a request for the feature application. Gateway 302 responds by providing a user interface portion 506 of the feature application to node 314, and user interface portion 506 is loaded on node 314 by node application 304. Meanwhile, a process portion 504 of the feature application is loaded on gateway 302. Alternatively, service portions 508 (of FIG. 5B) may be loaded on gateway 302 and/or node 314, or they may already exist on gateway 302 and/or node 314.

The distribution of the feature application 502 between gateway 302 and node 314 indicates that communication is to occur between process portion 504 or service portions 508 and user interface portion 506. Typically, user interface portion 506 makes a request for data or for other content. Process portion 504 or a service portion 508 receives the request and processes the request to produce one or more results. These results are returned to node 314 and presented and/or processed by user interface portion 506. Process portion 504 or a service portion 508 accesses one or more databases, retrieves content from the Internet or other upstream network such as a broadcast/cable/satellite television network, formats data, saves a file, opens a file, records a video stream, sets preferences, and so forth in response to the requests from user interface portion 506. For example, when a user interface portion 506 of an application 502 requests program guide data, the process portion 504 or service portion 508 that receives the request accesses the database that stores the program guide data, retrieves the program guide data, and formats the program guide data before returning the results of the request to the requesting user interface portion 506.

Other feature applications 502, such as a navigation application, a preferences application, an audio/video player application, a digital video recorder (DVR) application, a media jukebox application, a web browsing application, an e-mail application, an instant messaging application, etc., can be similarly implemented by providing a process portion 504 and a user interface portion 506 for each application 502 or by providing one or more service portions 508 and a user interface portion 506 for each application 502.

These applications 502 may be dynamically distributed at runtime in order to take advantage of the resources that may be available at either a node 314 and/or a gateway 302. The more intensive aspects and/or computationally intensive portions of a particular application 502 may be implemented on gateway 302, while the presentation or other relatively less intensive processing aspects of the particular application 502 may be implemented in a user interface portion 506 that is loaded at node 314 by a node application 304. Because gateway 302 is often used as if it were (also) a node 314, a version of node application 304 may also be implemented on gateway 302 so that the development of applications 502 may be uniform. In other words, programmers do not have to develop special cases of applications 502 for use with gateways 302, and users can execute an application 502 from a gateway 302 as if they were executing application 502 on a node 314 instead.

Exemplary Electronic Program Guide Display

Figure 6:
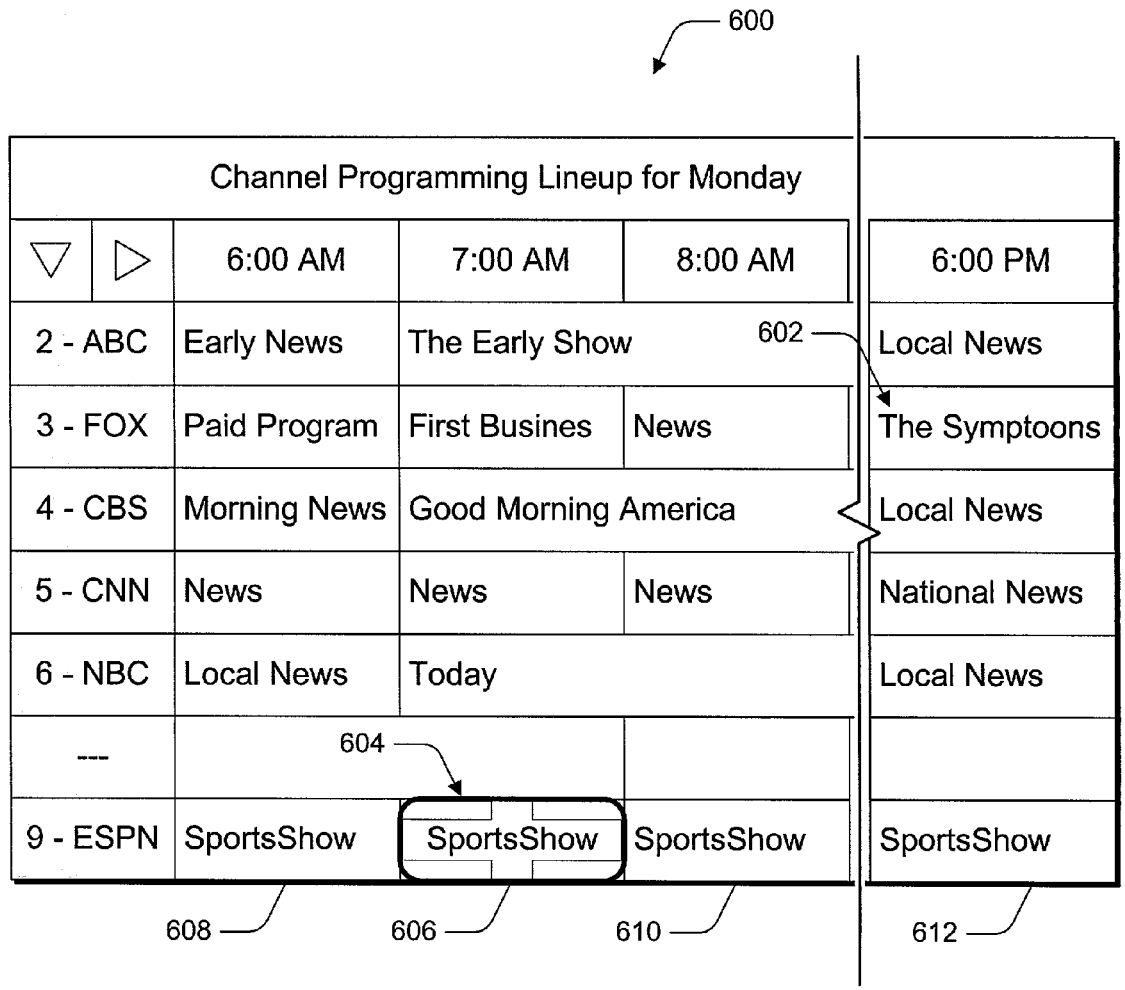
FIG. 6 illustrates a section of an exemplary EPG that is being displayed.

FIG. 6 illustrates a section 600 of an exemplary EPG that is being displayed. Section 600 of the EPG shows part of a channel programming lineup for Monday in the form of multiple lines of channel information. The EPG may be displayed using an application 502 (of FIGS. 5A and 5B) of a node 314/gateway 302 in conjunction with a display device 136/138/316/320/322 (of FIGS. 1 and 3) that is coupled thereto. The EPG may provide a viewer with a program title, an associated local channel number and/or television broadcasting company that is to broadcast the program, a time of the day that the program will be broadcast, and so forth. Descriptions of the programs, ratings thereof, etc. may also be included. For example, an episode 602 of the television program The Symptoons is scheduled for broadcast on local channel three (3) at 6:00 p.m. Although different horizontal lines of section 600 correspond to differing channels and different vertical lines correspond to differing programming times, section 600 may alternatively be formatted or configured, or otherwise show, different horizontal lines that correspond to differing programming times and different vertical lines that correspond to differing channels, as is used in Europe for example.

Section 600 of the EPG includes a focus "ring" 604 to identify a program title that a viewer can select to view the program if it is currently being broadcast, access program data to learn more about the program, enter a request to record one or more episodes of the program, read a changing description of the program on which focus ring 604 rests, and so forth. A viewer can move focus ring 604 around section 600 by manipulating remote control 204 (of FIG. 2), for example, to input a focus ring control command to a node 314. As shown, focus ring 604 identifies an episode 606 of the program SportsShow that is scheduled for broadcast by ESPN on local channel nine (9) at 7:00 a.m. Section 600 also shows that episodes 608, 610, and 612 of SportsShow are scheduled for broadcast on channel nine (9) at 6:00 a.m., 8:00 a.m., and 6:00 p.m., respectively. More or fewer than the illustrated number of channels may be displayed; similarly, a wider or a narrower field of time may be displayed. Furthermore, this number and field width may be configurable by node, by user, by display device, responsive to constraints of any of these, and so forth.

With remote control 204 or another input device or means, a user can cause the displayed section 600 of the EPG to scroll. Such a scroll input can be ordered by a user, for example, by pressing page up/down/left/right button(s), by pressing single line up/down/left/right scroll button(s), by attempting to move focus ring 604 "off" of the displayed section 600 of the EPG in any direction, and so forth. The scrolling can be effectuated in an upwards or downwards direction or in a rightwards or leftwards direction. Typically, but not necessarily, channels increase numerically with downward scrolling and decrease with upward scrolling while the broadcast time goes forward with rightward scrolling and goes backward with leftward scrolling. A dynamic EPG facilitates the display of sections 600 of the EPG as well as the scrolling thereof.

Dynamic Electronic Program Guide

Figure 7:
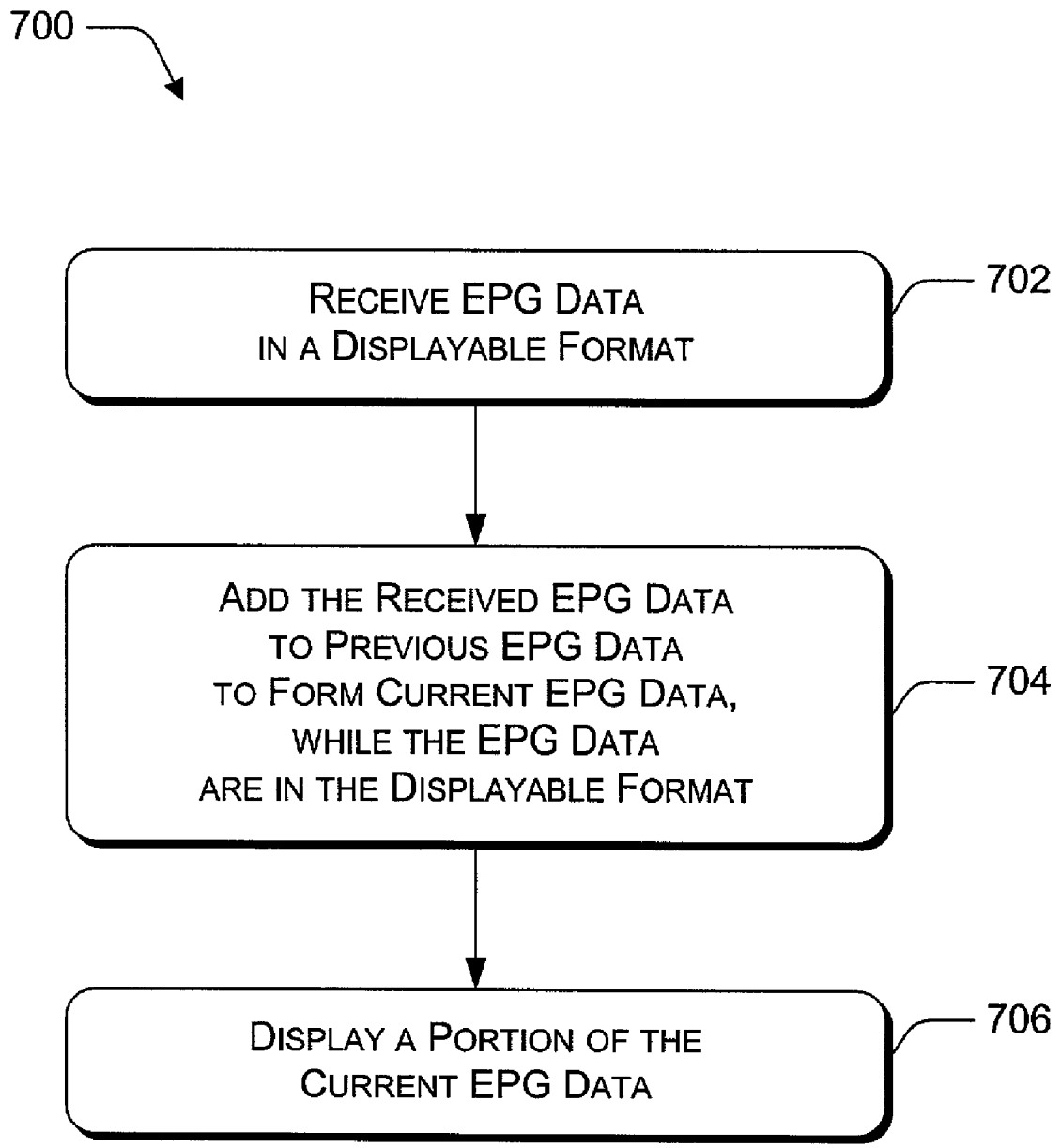
FIG. 7 is a flow diagram that illustrates an exemplary method for implementing a dynamic EPG.

FIG. 7 is a flow diagram 700 that illustrates an exemplary method for implementing a dynamic EPG. Flow diagram 700 includes three method blocks 702, 704, and 706. These method blocks may be implemented, for example, by a node 314, optionally in conjunction with a separate device that is capable of displaying an EPG to a user, such as devices 136/138/316/320/322 (of FIGS. 1 and 3). Furthermore, these method blocks may be implemented using a user interface portion 506 (of FIGS. 5A and 5B) of an EPG feature application implementation of application 502.

At block 702, EPG data that is in a displayable format is received. A displayable format is a post-processed format that is capable of being displayed on a display device, as opposed to a format better suited for storage in a database, for compressed transmission across a medium, and so forth. At block 704, the received EPG data is added to previous EPG data to form current EPG data. The received EPG data, the previous EPG data, and the current EPG data are in the displayable format during such addition. At block 706, at least a portion of the current EPG data is displayed. This displaying is facilitated by the current EPG data being in the displayable format. Unless the received EPG data was being prefetched for caching purposes, the at least a portion of the current EPG data that is displayed (at block 706) usually includes all of the received EPG data. However, this is not a requirement, and the at least a portion of the current EPG data that is displayed (at block 706) typically also includes at least one line of the previous EPG data to provide a reference to the user viewing the displayed EPG data.

Figure 8A:
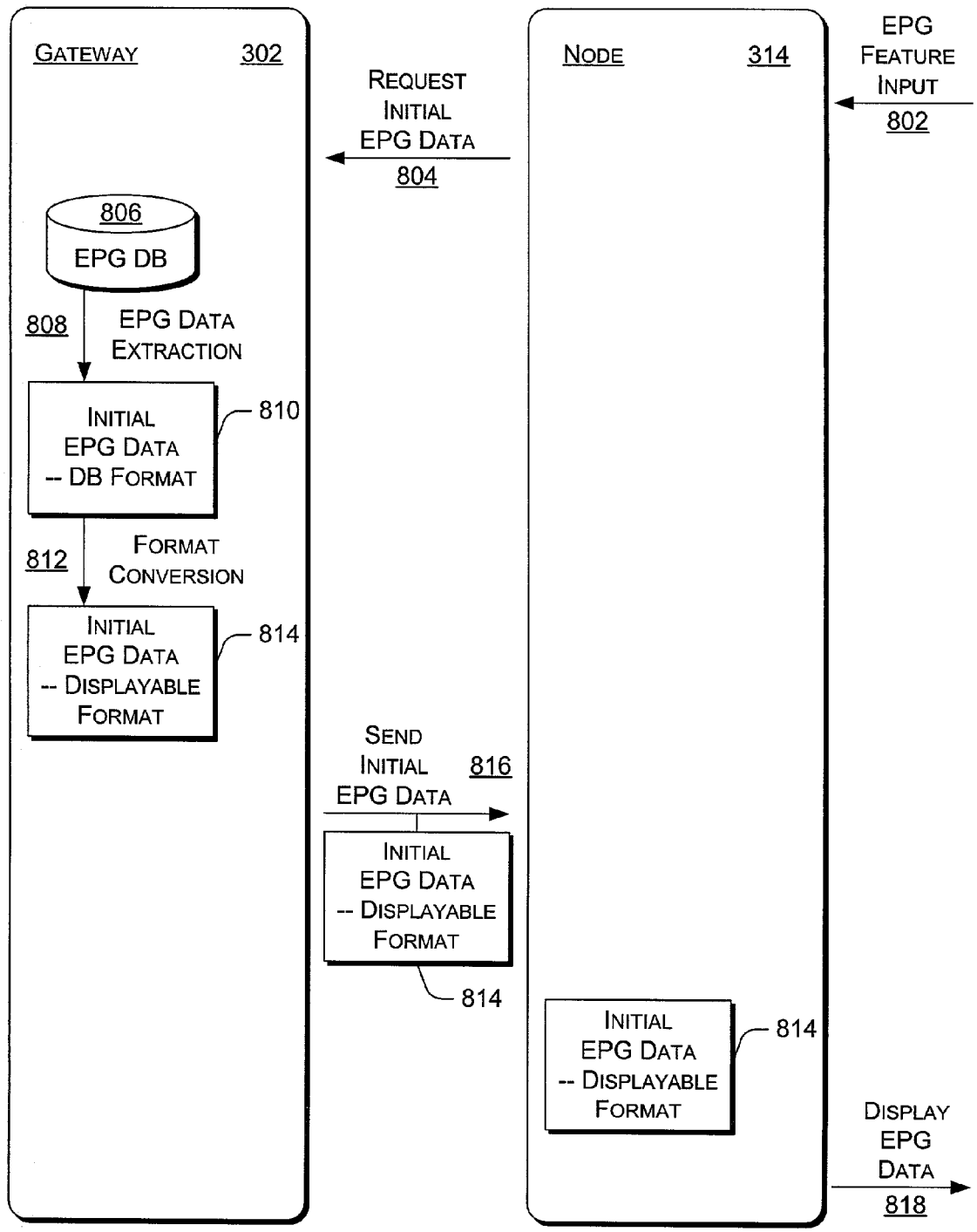
FIGS. 8A-8C are block diagrams that illustrate an exemplary implementation of a dynamic EPG.
Figure 8B:
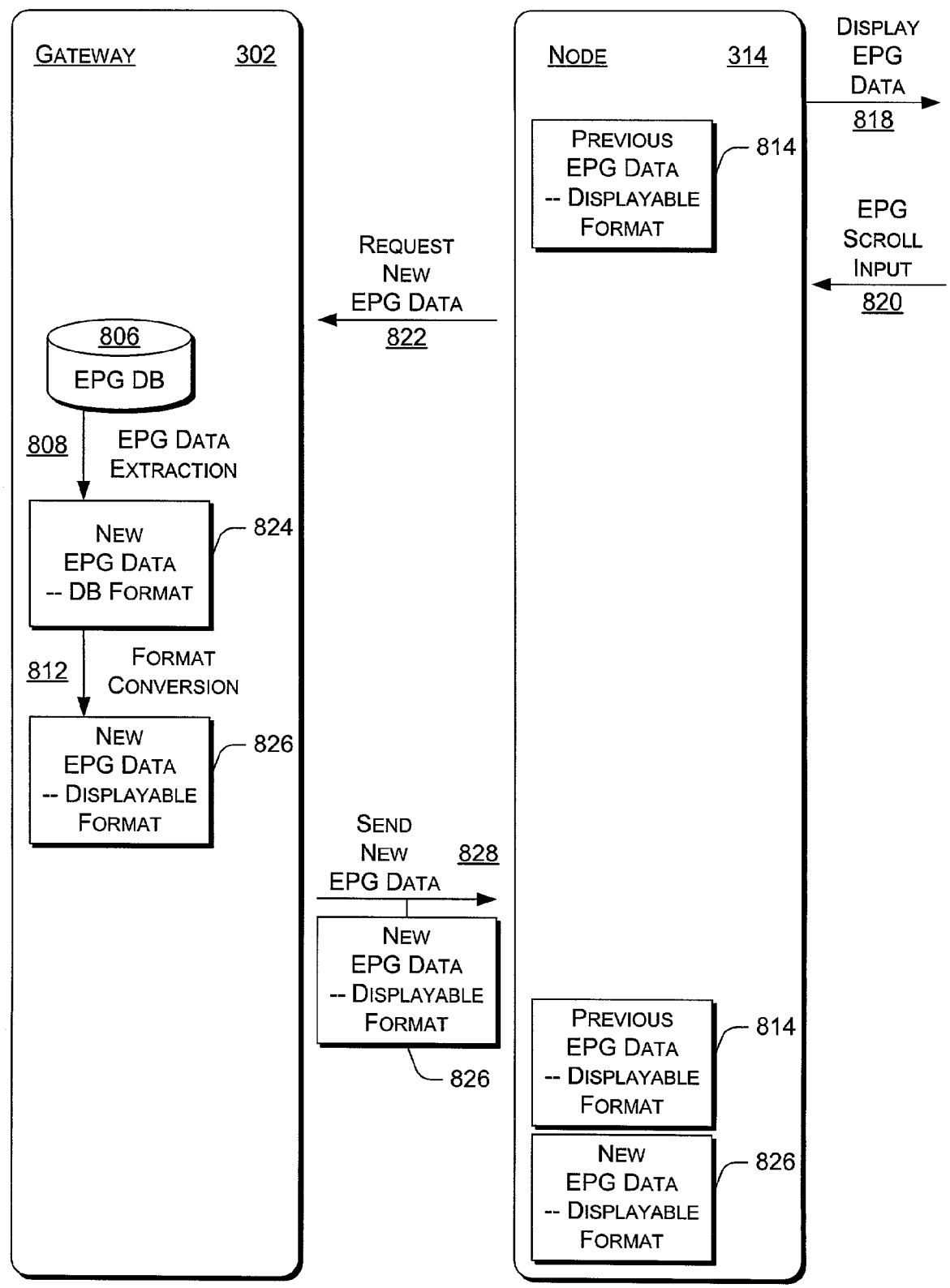
Figure 8C:
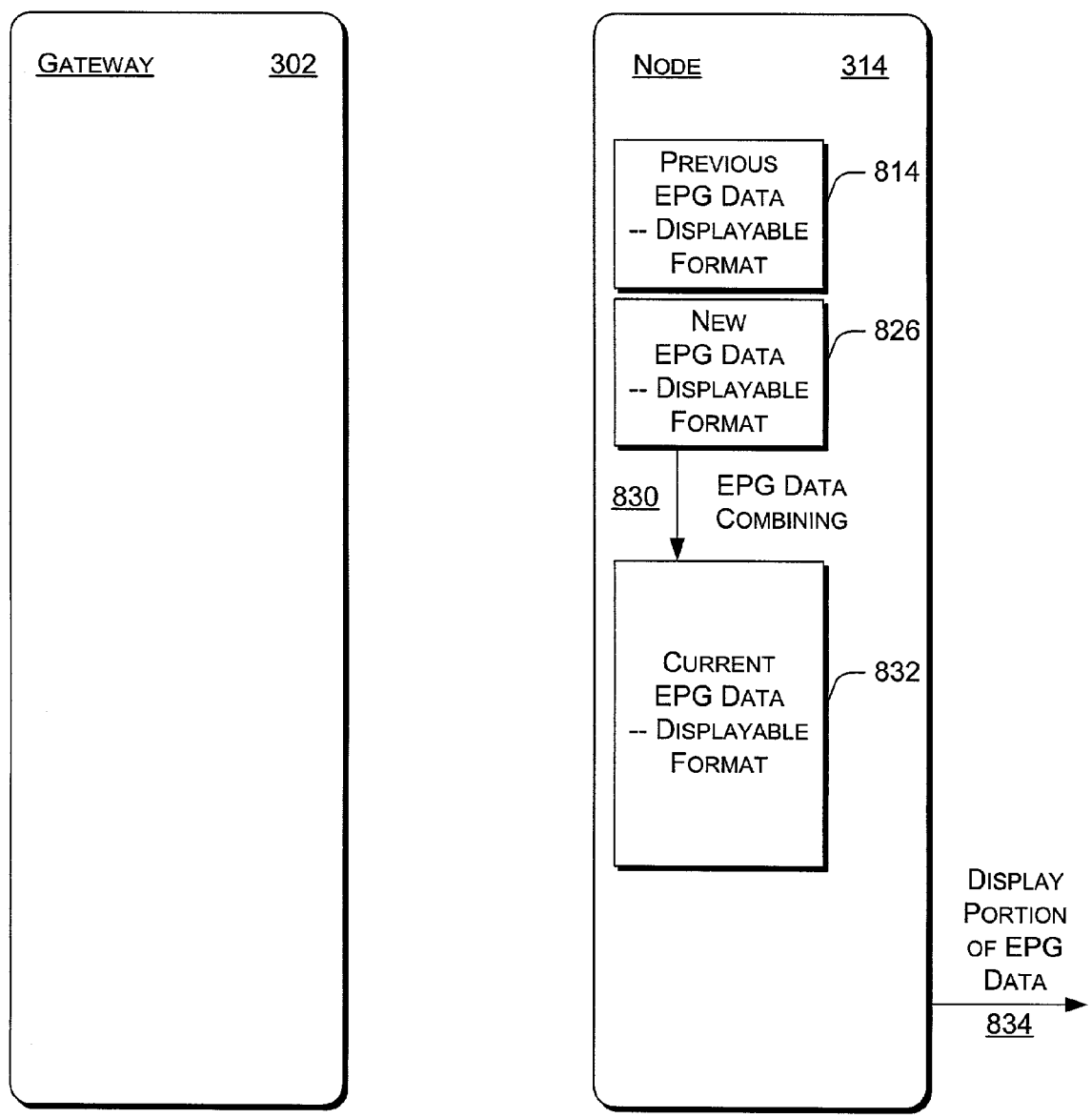

FIGS. 8A-8C are block diagrams of a node 314 and a gateway 302 that illustrate an exemplary implementation of a dynamic EPG. The dynamic EPG may be implemented, for example, using an EPG feature application implementation of distributed application 502 (of FIGS. 5A and 5B) that is being supported by a node application 304 (of FIGS. 3, 4A, 4B, 5A, and 5B). For example, the actions performed by node 314 may be effectuated using a user interface portion 506 or a service portion 508(3) while the actions performed by gateway 302 may be effectuated using a process portion 504 or a service portion 508(1,2). However, other implementations may alternatively be implemented as noted below. By way of example but not limitation, the respective functions performed by node 314 and gateway 302 may be effectuated by separate applications instead of a single distributed application. Also, an application performing the functions described for node 314 may not need to rely on a node application 304 for support. Additionally, multiple applications may work together to perform the functions described for node 314.

The exemplary implementation of a dynamic EPG as illustrated in FIG. 8A begins when a user provides an EPG feature input 802 that instructs a node 314 to display EPG data. The initial display of EPG data typically defaults to starting with the lowest channel in the lineup and the current time. However, other times and channels may alternatively be used for an initial EPG display. For example, a current channel to which node 314 is tuned may start the initial display of EPG data. Also, the user may be given an opportunity to input the starting time and channel for the initial EPG data. Regardless, node 314 sends a request for initial EPG data 804 to a gateway 302. Initial EPG data request 804 may be sent over a local network 300 as illustrated in FIG. 3. Alternatively, it may be sent further upstream over, e.g., broadcast network 110 (of FIG. 1) either directly or via gateway 302. As an example, node 314 may send initial EPG data request 804 directly over the Internet to a web server, which has EPG data stored thereat or otherwise accessible therefrom for responding to the request.

Gateway 302 includes an EPG database 806 that stores all or part of the EPG data for a given locale or lineup of a television-based entertainment network. EPG database 806 may be stored, for example, in storage 306 (of FIGS. 3, 5A, and 5B). The requested EPG data is extracted using an EPG data extraction mechanism 808. Any general database accessing approach may be employed. Alternatively, the EPG data of EPG database 806 may be especially tuned to facilitate the retrieval of EPG-type data and/or interaction with one or more mechanisms for manipulating the EPG data, as is described herein. Initial EPG data in a database format 810 is extracted from EPG database 806. The database format represents the format in which the database request is fulfilled. For example, the database format may correspond to an extensible markup language (XML) format.

EPG database 806 may actually store EPG data in any binary data format, text data format, SQL-based data format, or other standard or specialized format that is typically appropriate for facilitating storage and/or compression of the data. For example, a dataset for use by a DVR scheduler may be stored as binary data, XML data, and so forth. However, in addition to the above-enumerated database formats, the database format may also be a format to which the actual database data is converted or translated in order to fulfill a database request, such as an XML format in those implementations in which the EPG data is not stored directly in XML. The conversion/translation may be effectuated by EPG database 806 or by another aspect of gateway 302. Thus, a non-displayable format is presented to format conversion mechanism 812.

Initial EPG data in the database format 810 is converted to a displayable format using format conversion mechanism 812. Format conversion mechanism 812 produces initial EPG data in a displayable format 814 from initial EPG data in the database format 810. The displayable format is typically appropriate for rapid display of the information without significant, if any, processing thereof. For example, the displayable format may correspond to a hypertext markup language (HTML) format and variants thereof such as an extensible HTML (XHTML) format; a search results display format; an XML+Cascading Style Sheets (CSS) format; a Scalable Vector Graphics (SVG) format; and so forth. Thus, format conversion mechanism 812 converts XML data to HTML data in an exemplary described implementation. Format conversion mechanism 812 may be realized, for example, with an Extensible Stylesheet Language (XSL)-based mechanism that transforms data in an XML format into data in an HTML format.

Initial EPG data in the displayable format 814 is thus produced by format conversion mechanism 812 at gateway 302. Gateway 302 then responds to initial EPG data request 804 by sending an initial EPG data response 816 that includes initial EPG data in the displayable format 814. Once node 314 has received initial EPG data in the displayable format 814, node 314 causes the EPG data to be displayed. Specifically, node 314 causes the display of the EPG data by sending EPG data display signals 818 to a device (not shown in FIGS. 8A-8C) that is capable of displaying the EPG data. Such a display device may be separate from or integrated with node 314.

The exemplary implementation of a dynamic EPG as illustrated in FIG. 8B continues after EPG data display signals 818 have been provided to a display device such that EPG data in the displayable format 814 are being displayed. "Initial" EPG data in the displayable format 814 has been re-characterized as "previous" EPG data in the displayable format 814 to generalize FIGS. 8B and 8C to reflect EPG situations that extend beyond merely having and displaying the initial EPG data. While previous EPG data in the displayable format 814 (or a portion thereof) is being displayed, node 314 detects user input 820 that instructs node 314 to scroll the EPG data. EPG scroll input 820 is intended to cause a new section of the EPG data to be displayed. Again, the input may be provided using a remote control or other input device or means. Alternatively, EPG scroll input 820 may originate from an executing program. Responsive to EPG scroll input 820, node 314 sends a new EPG data request 822 to gateway 302. New EPG data request 822 includes an indication as to what EPG data and/or which EPG data section(s) is being requested.

Gateway 302 receives new EPG data request 822 and processes it analogously as described above with reference to elements 804-814 (of FIG. 8A). Specifically, EPG database 806 is accessed using EPG data extraction mechanism 808 to retrieve new EPG data in the database format 824. Format conversion mechanism 812 is applied to new EPG data in the database format 824 to produce new EPG data in the displayable format 826. Gateway 302 then sends a new EPG data message 828 that includes new EPG data in the displayable format 826 to node 314. Node 314 consequently has previous EPG data in the displayable format 814 and new EPG data in the displayable format 826.

The exemplary implementation of a dynamic EPG as illustrated in FIG. 8C continues once node 314 has both previous EPG data in the displayable format 814 and new EPG data in the displayable format 826. Node 314 combines previous EPG data in the displayable format 814 and new EPG data in the displayable format 826 while each remains in the displayable format using EPG data combining mechanism 830. The combining may be effectuated by, for example, inserting or appending/adding/concatenating the new EPG data into or to/onto/with the previous EPG data. It should be understood that these examples of combining are not necessarily mutually exclusive and that they should not necessarily be considered subsets of combining. Specifically, this combining by EPG data combining mechanism 830 may be realized, for example, with an ECMAScript/Document Object Model (ECMAScript/DOM)-based mechanism. With such a mechanism, a first document in a displayable format such as HTML may be dynamically added to a second document in a displayable format without altering or disrupting the displayable format aspect of either individual document or the combined document.

Generally, combining previous EPG data in the displayable format 814 and new EPG data in the displayable format 826 using EPG data combining mechanism 830 results in or creates current (or combined) EPG data in a displayable format 832. Current EPG data in the displayable format 832 can include both previous EPG data in the displayable format 814 and new EPG data in the displayable format 826. Node 314 uses current EPG data in the displayable format 832 to provide EPG data signals 834 that correspond to at least a portion thereof. Examples of such portions of current EPG data in the displayable format 832 are described below with reference to FIG. 9A. Node 314 may be made capable of displaying a portion of EPG data that is in a displayable format using, for example, one or more Cascading Style Sheets (CSS).

In implementations using CSS, the EPG data may be displayed using a relatively simple style sheet mechanism that allows authors and readers to attach style(s) (e.g., fonts, colors, spacing, etc.) to HTML documents. The CSS1 language, for example, is human readable and writable, and it is capable of expressing style in common desktop publishing terminology. One of the typical features of CSS is that style sheets can cascade; consequently, authors can attach a preferred style sheet while the reader may have a personal style sheet to adjust for human or technological handicaps and/or preferences. Rules for resolving conflicts between different style sheets may be employed.

In implementations using ECMAScript, the scripting capabilities are utilized at least partially as a manner for accessing the Document Object Model (DOM). Generally, ECMAScript is an object-oriented programming language for performing computations and manipulating computational objects within a host environment. More specifically, along with the typical computational abilities of script or code, ECMAScript may be used to script access to the DOM. This enables web pages that are dynamic such that their look and feel may be changed on the fly at runtime. ECMAScript in conjunction with DOM provides capabilities, for example, to perform any one or more of the following: manipulate the HTML document so as to reload a page, load a specific section of the EPG, manage and animate any dynamic scrolling, store runtime state on the client device, move and/or draw the focus ring, and so forth.

As a functional example, a CSS style sheet may be applied to an HTML-type document to limit the displayed part to only a portion of the total HTML document. Hence, an ECMAScript/DOM-based mechanism, in conjunction with at least one CSS style sheet, can enable node 314 to manipulate and display EPG data that is in a displayable format while it remains in the displayable format. Thus, an exemplary application for node 314, such as an EPG feature application implementation of distributed application 502, includes capabilities for interacting with HTML-type documents using an ECMAScript/DOM-based mechanism and for utilizing at least one CSS style sheet when causing portions of HTML-type documents to be displayed. Such an exemplary application may be a browser program or similar that is capable of executing on a myriad of platforms of varying complexity and capability.

Figure 9A:
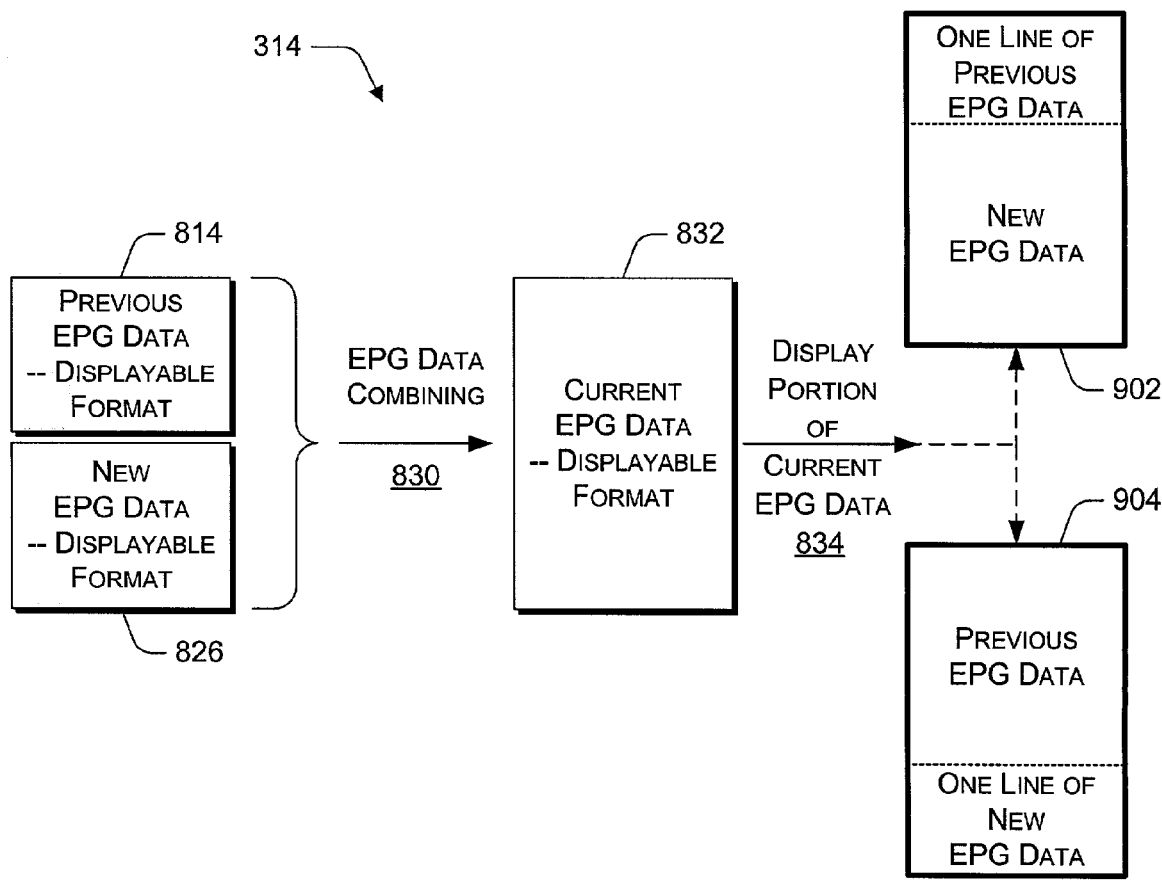
FIGS. 9A and 9B illustrate exemplary displays of EPG data.
Figure 9B:
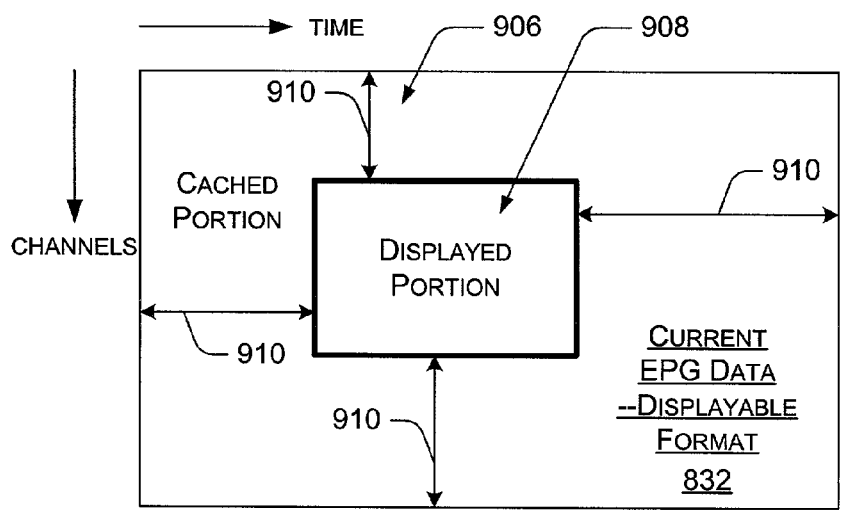

FIGS. 9A and 9B illustrate exemplary displays of EPG data. Different options for displaying and/or caching EPG data are described. At least the left and central parts of FIG. 9A correspond to a node 314 as described above with particular reference to FIG. 8C. In other words, previous EPG data in the displayable format 814 and new EPG data in the displayable format 826 are combined using EPG data combining mechanism 830 to produce current EPG data in the displayable format 832. Current EPG data in the displayable format 832 therefore includes the previously stored EPG data and the new EPG data that was retrieved in order to fulfill an EPG display scroll request input by a user.

The amount or portion of previous EPG data in the displayable format 814 that is displayed, as a result of providing current EPG data signals 834 to a separate or integrated display device, depends on a number of factors. For example, none of previous EPG data in the displayable format 814 may be displayed in a paged scrolling operation. In this case, all of the newly displayed EPG data is from new EPG data in the displayable format 826. However, a scrolling frame of reference is usually provided to a user/viewer by displaying at least one line of previous EPG data in the displayable format 814 after a scrolling operation is completed. The number of line or lines of previous EPG data that remain after the scrolling operation typically depends on the type of scrolling operation and the number of horizontal channel lines being displayed at any given time.

If a page scroll request was made by the user (e.g., at EPG scroll input 820 (of FIG. 8B)), then one line of previous EPG data may be maintained while the remainder of the EPG display 902 is occupied by new EPG data. If, on the other hand, a single-line scroll request was made by the user, then one line of new EPG data is displayed while the remainder of the EPG display 904 is occupied by previous EPG data. The selection and display of the EPG displays 902 and/or 904 may be effectuated from the total current EPG data in the displayable format 832 using, for example, at least one CSS style sheet. It should be understood that scrolling operations and the "lines" of EPG data as used herein may be in an upwards or downwards direction or in a leftwards or rightwards direction. Also, the channel domain may correspond to horizontal lines for upwards/downwards scrolling while the (program) time (slot) domain may correspond to vertical lines for leftwards/rightwards scrolling, or vice versa.

FIG. 9B illustrates an exemplary current EPG data in the displayable format 832 situation that includes a cached portion 906 and a displayed portion 908. Current EPG data in the displayable format 832 is shown with the (programming) time (slot) dimension increasing in the rightwards direction and the channel dimension increasing in the downward direction. Displayed portion 908 may correspond, for example, to displayed section 600 (of FIG. 6) of the EPG data. Displayed portion 908 may be dynamically manipulated (e.g., excerpted for display) using at least one CSS style sheet or other display mechanism that is capable of operating on data in a displayable format such as HTML-based documents. Hence, in a described implementation, current EPG data in the displayable format 832 may be realized using a single HTML document.

Displayed portion 908 is excerpted from current EPG data in the displayable format 832 out of cached portion 906. Cached portion 906 is defined in the upwards, rightwards, downwards, and leftwards directions by arrows 910. Although shown as being non-symmetrical, cached portion 906 may be symmetrically distributed around displayed portion 908. Cached portion 906 may be "inadvertently" created as a user scrolls around EPG data and additional lines are retrieved for display if previously-displayed lines of EPG data are kept in memory as current EPG data in the displayable format 832 (i.e., instead of being removed therefrom). On the other hand, cached portion 906 may be intentionally created using a prefetching mechanism. An intentional prefetching mechanism may be instituted to reduce EPG display latency if memory resources permit the storage of sufficient EPG data.

Because a prefetching mechanism introduces additional overhead besides memory storage demands, such as increased processing requirements, implementing a prefetching mechanism may be undesirable unless EPG data retrieval latency is sufficiently great so as to be noticeable by a user. In an exemplary prefetching mechanism, cached portion 906 is maintained in the vicinity of or in proximity to displayed portion 908 in each direction 910 such that one or more page scrolling request inputs from a user may be fulfilled without a user detecting EPG data retrieval latency. Hence, displayed portion 908 may be moved around current EPG data in the displayable format 832 along a direction 910 of cached portion 906. Meanwhile, cached portion 906 is being replenished, for example, with a procedure call accessing an EPG database (e.g., EPG database 806 of gateway 302 (of FIG. 8B)). Exemplary prefetching processes for a cached portion 906 are described further below.

Methods for Dynamic Electronic Program Guides

Applications implementing dynamic EPGs may be described in the general context of computer-executable instructions. Generally, computer-executable instructions include routines, programs, objects, components, data structures, and the like that perform particular functions or implement particular abstract data types. The dynamic alteration, manipulation, and/or presentation of EPGs may also be practiced in distributed computing environments where functions are performed by remote processing devices such as gateways and nodes that are linked through a communications network. In a distributed computing environment, computer-executable instructions may be located in both local and remote computer storage media.

Figure 10:
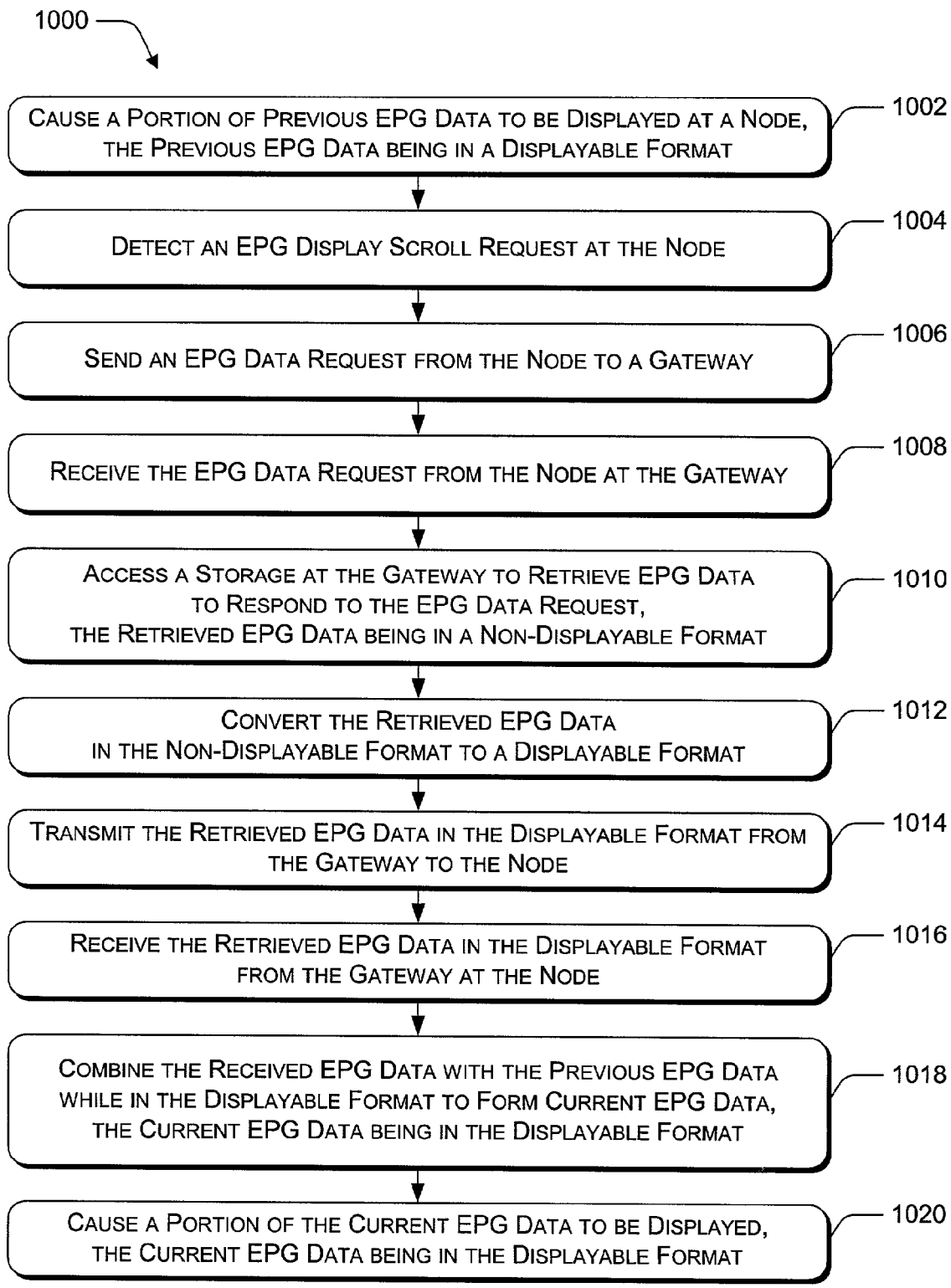
FIG. 10 is a flow diagram that illustrates another exemplary method for implementing a dynamic EPG.

The methods of FIGS. 7 and 10 are illustrated in flow diagrams divided into multiple method blocks. However, the order in which the methods are described is not intended to be construed as a limitation, and any number of the described method blocks can be combined in any order to implement one or more methods for dynamic rate control. Furthermore, although the methods of FIG. 10 are described below with reference to television entertainment environments 100 and 200, as well as local network 300 where applicable, the methods can be implemented in any suitable hardware, software, firmware, or combination thereof.

FIG. 10 is a flow diagram 1000 that illustrates another exemplary method for implementing a dynamic EPG. Flow diagram 1000 includes 10 method blocks 1002 to 1020. The exemplary method for dynamically manipulating EPG data may be performed, for example, by a node 314 and a gateway 302 as described above, especially with reference to FIGS. 3-5B and 8A-9. At block 1002, a node causes at least a portion of previous EPG data to be displayed, the previous EPG data being in a displayable format. The displayable format may correspond to an HTML document, for example. At block 1004, the node detects an EPG display scroll request input from a user. The user may provide the input using scroll keys, page up/down buttons, etc. from a remote control, by selecting menu options, and so forth. At block 1006, the node sends an EPG data request to a gateway. For example, the node may send a function or procedure call to the gateway, e.g., between two different portions of a distributed application. At block 1008, the gateway receives the EPG data request from the node.

At block 1010, the gateway accesses a storage device to retrieve EPG data to respond to the EPG data request. The EPG data that is retrieved is in a non-displayable format in this implementation. For example, the EPG data may be in an XML format. At block 1012, the retrieved EPG data in the non-displayable format is converted into a displayable format. This displayable format may also be in an HTML document form, and the conversion may be effectuated using an Extensible Stylesheet Language (XSL)-based mechanism. At block 1014, the gateway transmits the retrieved EPG data in the displayable format to the node. At block 1016, the node receives the retrieved EPG data from the gateway, the retrieved EPG data thereby being the received EPG data at the node. The node therefore has both the received EPG data and the previous EPG data in the displayable format. The EPG data may be stored, for example, in a memory of the node such as memory 404 (of FIG. 4A) of node 314.

At block 1018, the received EPG data is combined with/ added to the previous EPG data to form current EPG data. This current EPG data is also in the displayable format. The combining/adding is performed while the received EPG data and the previous EPG data are in the displayable format. This joining of EPG data may be effectuated using, for example, an ECMAScript/DOM-based mechanism. At block 1020, the node causes at least a portion of the current EPG data to be displayed. Various exemplary options for which or what portion of the current EPG data is to be displayed are described above with reference to FIGS. 9A and 9B. The displaying on a display device of a portion of the current EPG data may be effectuated using, at least partly, one or more CSS style sheets. Before, during, and/or after the displaying, the node can be awaiting further input from the user.

Exemplary Implementations for Dynamic Electronic Program Guides

In this section, exemplary functional implementations are described in textual form. Although other formats and mechanisms may alternatively be employed, these functional implementations are described in terms of exemplary formats and mechanisms such as XML/HTML and XSL/ECMAScript-DOM/CSS style sheets, respectively.

Generally, an exemplary dynamic EPG process may include the following:

A user action.
If the user action requires EPG data that is not already displayed or cached, then
A request to an EPG database.
A fulfillment of the request in XML.
A transform of the XML into HTML via XSL.
A transmission of the HTML to the requester.
A display of the HTML with reference to a CSS style sheet.
A dynamic response to user action and/or animation that is managed via ECMAScript and DOM.

There are two typical EPG data movement scenarios that may be generalized to both leftward/rightward movement in the program time slot dimension and upward/downward movement in the channel dimension. These two typical scenarios are single line movements and paged movements. Moving leftward or rightward is similar to moving upward or downward, so this description focuses on up/down movement in the channel dimension without loss of generality. Also, moving up is similar to moving down, so this description further focuses on downward movement without loss of generality. Thus, there are eight (8) permutations from the four directions and the two movement scenarios per direction. However, the description below addresses two of these eight permutations without loss of generality: a single line movement downward and a paged movement downward.

Assuming N horizontal lines of channels that are displayed and visible in a section of the EPG data (termed a "grid" in the description of these processes), there are three scenarios. The three scenarios are an initial display, a single line downward scroll, and a paged downward scroll.

Initial Display
1) Node requests N lines of data from database based on "default" starting channel.
2) Database fulfills request in XML.
3) XML transformed via XSL into HTML that is appropriate for displaying N lines, including "encoding" any data that the node may need to make successive requests.
4) New lines of HTML received by node and inserted into HTML document via ECMAScript/DOM.
5) There are now N lines of data, all visible.

A Single Line Downward Scroll
1) User action "down".
2) Node determines what information database needs to fetch the next channel's/line's information.
3) Node requests one line of data from database.
4) Database fulfills request in XML.
5) XML transformed via XSL into HTML that is appropriate for displaying one line, including "encoding" any data that the node may need to make successive requests.
6) New line of HTML received by node and inserted into document via ECMAScript/DOM.
7) There are now N+1 lines of data, the first N of which are visible.
8) Grid is redrawn, possibly with animation (such as a smooth scroll) to reveal new line at bottom and obscure line at top via ECMAScript/DOM.
9) There are now N+1 lines of data, the last N of which are visible.
10) The first line, now not visible, is removed from the document via ECMAScript/DOM. (If memory resources permit, this aspect may be omitted or delayed.)
11) There are now N lines of data, all visible.

A Paged Downward Scroll
1) User action "page down".
2) Node determines what information database needs to fetch the next page (N−1) of channel's/line's information.
3) Node requests N−1 "lines" of data from database.
4) Database fulfills request in XML.

5) XML transformed via XSL into HTML that is appropriate for displaying N−1 lines, including "encoding" any data that the node may need to make successive requests.
6) New lines of HTML received by node and appended to document via ECMAScript/DOM.
7) There are now 2N−1 lines of data, the first N of which are visible.
8) Grid is redrawn, possibly with animation (such as a smooth scroll) to reveal new lines at bottom and obscure lines at top via ECMAScript/DOM.
9) There are now 2N−1 lines of data, the last N of which are visible.
10) The first N−1 lines, now not visible, are removed from the document via ECMAScript/DOM. (If memory resources permit, this aspect may be omitted or delayed.)
11) There are now N lines of data, all visible.

The above three scenarios are simpler relative to the following caching-oriented scenarios. The non-caching scenarios above are typically preferable when the request to the database, the fulfillment of the request, and the transformation of the data format are relatively fast, and/or when smaller memory sizes are an issue. All requests and fulfillments in such scenarios can be synchronous and blocking.

However, when the time to request and receive the data is relatively long, such as with a great amount of data or over a slower connection, it is typically preferable to implement a caching scenario to improve the responsiveness to user actions. In caching scenarios, a dynamic EPG implementation attempts to keep an extra M lines above and below (and to the right and left of) the grid that are not visible to the user but act as a "cache." The variable M is determined by a combination of the maximum lines through which the user can scroll in one action (in this case N−1, a "page down/up" action) and the time it takes to receive an equivalent amount of EPG data.

The following caching scenarios assume that the time it takes to receive N−1 lines of EPG data is equal to the time it takes to display and animate the transition from one set of such lines to the final set of EPG data lines during a page down. As such, the steps of the non-caching paging down scenario above are altered by making an asynchronous request for a new page (N−1 lines) of data; scrolling immediately to the cached lines (M in this case being N−1); and then, by the time the scrolling is completed, receiving the asynchronous fulfillment of the earlier request. This EPG data request fulfillment is appended to the document but invisible to the user; it becomes the new part of the cache for quick response to subsequent user downward scrolling action(s).

The modified steps for exemplary caching implementations for dynamic EPGs then become as follows. Assuming N horizontal lines of channels that are displayed and visible in the grid of the EPG data and M lines of cache for user action, there are these three scenarios. These three scenarios are an initial display, a single line downward scroll, and a paged downward scroll.

Initial Display—Caching
1) Node requests N+2M lines of data from database. The lines are centered on the "default" starting channel. (If the program time dimension is to be cached as well, then the length of each horizontal line may be three times the visible grid to account for leftward and rightward paging movements.)
2) Database fulfills request in XML.
3) XML transformed via XSL into HTML that is appropriate for displaying N lines starting from the default channel (with M lines of data "hidden" at the top and bottom each of the grid), including "encoding" any data that the node may need to make successive requests.
4) New lines of HTML received by node and inserted into document via ECMAScript/DOM.
5) There are now N+2M lines of data, the middle N of which are visible.

A Single Line Downward Scroll—Caching
1) User action "down".
2) Node determines what information database needs to fetch the next channel's/line's information figuring from end of current M lines of cache.
3) Node requests single "line" of data from database asynchronously and non-blocking.
4) Grid is redrawn, possibly with animation (such as a smooth scroll) to reveal new line at bottom and obscure line at top via ECMAScript/DOM.
5) During step 4:
   a) Database fulfills request in XML.
   b) XML transformed via XSL into HTML that is appropriate to displaying a line, including "encoding" any data that the node may need to make successive requests.
   c) New line of HTML received by node and appended to document via ECMAScript/DOM.
   d) Extra line of cache now at top of document is removed. (If memory resources permit, this aspect may be omitted or delayed.)
6) There are now N+2M lines of data, the middle N of which is visible.

A Paged Downward Scroll—Caching
1) User action "page down".
2) Node determines what information database needs to fetch the next page (N−1) of channel's/line's information figuring from end of current M lines of cache.
3) Node requests N−1 "lines" of data from database asynchronously and non-blocking.
4) Grid is redrawn, possibly with animation (such as a smooth scroll) to reveal N−1 new lines at bottom and obscure lines at top via ECMAScript/DOM.
5) During step 4:
   a) Database fulfills request in XML.
   b) XML transformed via XSL into HTML that is appropriate for displaying N−1 lines, including "encoding" any data that the node may need to make successive requests.
   c) New lines of HTML received by node and appended to document via ECMAScript/DOM.
   d) Extra N−1 lines of cache now at top of document are removed. (If memory resources permit, this aspect may be omitted or delayed.)
6) There are now N+2M lines of data, the middle N of which is visible.

Thus, in this manner, these exemplary implementations for dynamic EPGs may accommodate caching scenarios as well.

CONCLUSION

Although systems and methods have been described in language specific to structural features and/or methods, it is to be understood that the invention defined in the appended claims is not necessarily limited to the specific features or methods described. Rather, the specific features and methods are disclosed as exemplary forms of implementing the claimed invention.

The invention claimed is:

1. A method for dynamically manipulating electronic program guide (EPG) data, the method comprising actions of:
   receiving an EPG data request from a node at a gateway;
   accessing a memory storage at the gateway to retrieve EPG data for the EPG data request, the retrieved EPG data being in a non-displayable format, wherein the non-displayable format comprises an extensible markup language (XML) format;
   converting the retrieved EPG data in the non-displayable format to the displayable format, wherein the action of converting comprises transforming the retrieved EPG data in the non-displayable format to the retrieved EPG data in the displayable format using an extensible style sheet language (XSL)-based mechanism, wherein the displayable format comprises a combination of two or more formats selected from the group comprising a hypertext markup language (HTML) format, an extensible hypertext markup language (XHTML) format, a search results display format, an extensible markup language plus cascading style sheets (XML+CSS) format, and a scalable vector graphics (SVG) format;
   transmitting the retrieved EPG data in the displayable format from the gateway to the node;
   receiving EPG data from the node, the received EPG data being in a displayable format;
   adding the received EPG data to previous EPG data to form current EPG data, the previous EPG data and the current EPG data being in the displayable format using an ECMAScript/document object model (ECMAScript/DOM)-based mechanism, the ECMAScript/DOM-based mechanism dynamically adding a first document containing received EPG data in a first displayable format to a second document containing previous EPG data in a second displayable format to create a combined document without altering the format of the first document and the second document or the combined document; and
   causing at least a portion of the current EPG data to be displayed, wherein the action of adding is performed while the received EPG data and the previous EPG data are in the displayable format.

2. The method as recited in claim 1, wherein the method is performed by a node of a local network.

3. The method as recited in claim 2, wherein the node comprises a client device of a television-based entertainment environment.

4. The method as recited in claim 1, wherein the external source comprises a gateway of a local network.

5. The method as recited in claim 1, wherein the displayable format comprises a hypertext markup language (HTML) format.

6. The method as recited in claim 1, wherein the displayable format comprises an extensible hypertext markup language (XHTML) format.

7. The method as recited in claim 1, wherein the displayable format comprises a search results display format.

8. The method as recited in claim 1, wherein the displayable format comprises an extensible markup language plus cascading style sheets (XML+CSS) format.

9. The method as recited in claim 1, wherein the displayable format comprises a scalable vector graphics (SVG) format.

10. The method as recited in claim 1, wherein the action of receiving comprises receiving the EPG data from a gateway over a local network link.

11. The method as recited in claim 10, wherein the local network link comprises at least one of a wireless and a wired network link.

12. The method as recited in claim 1, wherein the received EPG data that is received in the action of receiving EPG data comprises the retrieved EPG data that is transmitted in the action of transmitting.

13. The method as recited in claim 1, wherein the non-displayable format comprises an extensible markup language (XML) format.

14. The method as recited in claim 1, wherein the action of causing comprises:
   providing video signals that carry the at least a portion of the current EPG data to a device that is capable of rendering the at least a portion of the current EPG data.

15. The method as recited in claim 1, wherein the action of causing comprises:
   displaying the at least a portion of the current EPG data on an integrated display screen.

16. The method as recited in claim 1, wherein the at least a portion of the current EPG data to be displayed comprises the received EPG data.

17. The method as recited in claim 1, wherein the at least a portion of the current EPG data to be displayed comprises the received EPG data and at least one line of the previous EPG data.

18. The method as recited in claim 1, wherein the action of causing comprises:
   implementing an animation to cause the at least a portion of the current EPG data to be displayed.

19. One or more electronically-accessible storage media comprising electronically-executable instructions that, when executed, direct an electronic apparatus to perform the method as recited in claim 1.

20. The method as recited in claim 1, wherein the current EPG data comprises a plurality of lines of channel information, each line of channel information of the plurality of lines of channel information comprising at least a title of a program and an associated time frame of the program; and wherein the action of causing comprises:
   causing at least a portion of the plurality of lines of channel information to be displayed.

21. A method for dynamically manipulating electronic program guide (EPG) data, the method comprising actions of:
   causing at least a portion of previous EPG data to be displayed, the previous EPG data being in a displayable format;
   detecting an EPG display scroll request at a node;
   sending an EPG data request from the node to a gateway;
   receiving the EPG data request from the node at the gateway;
   accessing a storage at the gateway to retrieve EPG data for the EPG data request, the retrieved EPG data being in a non-displayable format;
   converting the retrieved EPG data in the non-displayable format to the displayable format, wherein the displayable format comprises a hypertext markup language (HTML) format, and the non-displayable format comprises an extensible markup language (XML) format and further wherein the action of converting comprises transforming the retrieved EPG data in the non-displayable format to the retrieved EPG data in the displayable format using an extensible stylesheet language (XSL)-based mechanism;
   transmitting the retrieved EPG data in the displayable format from the gateway to the node;

receiving the retrieved EPG data from the gateway at the node, the retrieved EPG data comprising received EPG data;

adding the received EPG data to the previous EPG data to form current EPG data, the current EPG data being in the displayable format, wherein the action of adding comprises appending the received EPG data in the displayable format to the previous EPG data in the displayable format to form the current EPG data in the displayable format using an ECMAScript/document object model (ECMAScript/DOM)-based mechanism, the ECMAScript/DOM-based mechanism dynamically adding a first document containing received EPG data in a first displayable format to a second document containing previous EPG data in a second displayable format to create a combined document without altering the format of the first document and the second document or the combined document; and causing at least a portion of the current EPG data to be displayed, wherein the action of causing at least a portion of the current EPG data to be displayed comprises causing the at least a portion of the current EPG data to be displayed on a display device using an ECMAScript/document object model (ECMAScript/DOM)-based mechanism of a browser application;

wherein the action of adding is performed while the received EPG data and the previous EPG data are in the displayable format.

22. The method as recited in claim 21, wherein the node and the gateway comprise at least part of a local network.

23. One or more electronically-accessible storage media comprising electronically-executable instructions that, when executed, direct an electronic apparatus to perform the method as recited in claim 21.

24. A method for displaying an electronic program guide (EPG), the method comprising actions of:
causing at least a portion of current EPG data in a first format to be displayed;
requesting new EPG data from a storage having an EPG database;
receiving the new EPG data in a second format, wherein the first format comprises a hypertext markup language (HTML) format, and the second format comprises an extensible markup language (XML) format;
converting the new EPG data in the second format into new EPG data in the first format;
combining the current EPG data in the first format and the new EPG data in the first format into combined EPG data in the first format without changing formats, wherein the action of combining comprises inserting the new EPG data in the first format into the current EPG data in the first format to produce the combined EPG data in the first format without changing formats using an ECMAScript/document object model (ECMAScript/DOM)-based mechanism, the ECMAScript/DOM-based mechanism dynamically adding a first document containing new EPG data in a first displayable format to a second document containing current EPG data in a second displayable format to create a combined document containing the combined EPG data without altering the format of the first document, the second document or the combined document; and
causing at least a portion of the combined EPG data in the first format to be displayed, wherein the action of causing at least a portion of the combined EPG data in the first format to be displayed comprises causing the at least a portion of the combined EPG data in the first format to be displayed with reference to a cascading style sheet (CSS).

25. The method as recited in claim 24, wherein the method is performed, at least partially, by an application that is distributed across a node and a gateway of a local network.

26. The method as recited in claim 24, wherein the actions of causing and combining are performed by an application at a node of a local network.

27. The method as recited in claim 24, wherein the actions of receiving and converting are performed by an application at a gateway of a local network.

28. The method as recited in claim 24, wherein a request for new EPG data of the action of requesting originates at least one of a node and a gateway of a local network.

29. The method as recited in claim 24, wherein the action of requesting comprises:
sending a request for new EPG data from a node to a gateway;
receiving the request for new EPG data at the gateway;
accessing the EPG database to extract the new EPG data in the second format, the EPG database at least co-located with the gateway.

30. The method as recited in claim 24, wherein the action of requesting comprises:
sending a request for new EPG data from a gateway of a local network to the EPG database, the EPG database located external to the local network.

31. The method as recited in claim 24, wherein the first format comprises one or more formats selected from the group comprising a hypertext markup language (HTML) format, an extensible hypertext markup language (XHTML) format, a search results display format, an extensible markup language plus cascading style sheets (XML+CSS) format, and a scalable vector graphics (SVG) format.

32. The method as recited in claim 24, wherein the action of converting comprises:
transforming the new EPG data in the second format into the new EPG data in the first format using an extensible stylesheet language (XSL)-based mechanism.

33. The method as recited in claim 24, wherein the at least a portion of the combined EPG data includes at least part of the new EPG data.

34. One or more electronically-accessible storage media comprising electronically-executable instructions that, when executed, direct an electronic apparatus to perform the method as recited in claim 24.

35. A computer readable medium having stored thereon computer executable instructions causing a computer to execute a process comprising:
causing at least a portion of current EPG data in a first format to be displayed;
requesting new EPG data from a storage having an EPG database;
receiving the new EPG data in a second format, wherein the first format comprises a hypertext markup language (HTML) format, and the second format comprises an extensible markup language (XML) format;
converting the new EPG data in the second format into new EPG data in the first format;
combining the current EPG data in the first format and the new EPG data in the first format into combined EPG data in the first format without changing formats, wherein the action of combining comprises inserting the new EPG data in the first format into the current EPG data in the first format to produce the combined EPG data in the first format without changing formats using an ECMAScript/document object model (ECMAScript/DOM)-based mechanism, the ECMAScript/DOM-based mechanism dynamically adding a first document containing new EPG data in a first displayable format to a second document containing current EPG data in a second displayable format to create a combined document containing the combined EPG data without altering the format of the first document, the second document or the combined document, and causing at least a portion of the combined EPG data in the first format to be displayed, wherein the action of causing at least a portion of the combined EPG data in the first format to be displayed comprises causing the at least a portion of the combined EPG data in the first format to be displayed with reference to a cascading style sheet (CSS).

36. A computer readable media according to claim 35, wherein the process is performed, at least partially, by an application that is distributed across a node and a gateway of a local network.

37. A computer readable media according to claim 35, wherein the actions of causing and combining are performed by an application at a node of a local network.

38. A computer readable media according to claim 35, wherein the actions of receiving and converting are performed by an application at a gateway of a local network.

39. A computer readable media according to claim 35, wherein a request for new EPG data of the action of requesting originates at least one of a node and a gateway of a local network.

40. A computer readable media according to claim 35, wherein the action of requesting comprises:
  sending a request for new EPG data from a node to a gateway;
  receiving the request for new EPG data at the gateway;
  accessing the EPG database to extract the new EPG data in the second format, the EPG database at least co-located with the gateway.

41. A computer readable media according to claim 35, wherein the action of requesting comprises:
  sending a request for new EPG data from a gateway of a local network to the EPG database, the EPG database located external to the local network.

* * * * *